US012437248B2

(12) United States Patent
Webber

(10) Patent No.: US 12,437,248 B2
(45) Date of Patent: Oct. 7, 2025

(54) METHOD AND SYSTEM FOR ORGANIZING EVENTS

(71) Applicant: Cole Webber, Red Deer (CA)

(72) Inventor: Cole Webber, Red Deer (CA)

( * ) Notice: Subject to any disclaimer, the term of this patent is extended or adjusted under 35 U.S.C. 154(b) by 0 days.

(21) Appl. No.: 17/288,605

(22) PCT Filed: Nov. 1, 2019

(86) PCT No.: PCT/CA2019/051552
§ 371 (c)(1),
(2) Date: Apr. 26, 2021

(87) PCT Pub. No.: WO2020/087180
PCT Pub. Date: May 7, 2020

(65) Prior Publication Data
US 2022/0012659 A1    Jan. 13, 2022

Related U.S. Application Data

(60) Provisional application No. 62/754,328, filed on Nov. 1, 2018.

(51) Int. Cl.
*G06Q 10/00* (2023.01)
*G06Q 10/04* (2023.01)
(Continued)

(52) U.S. Cl.
CPC ....... *G06Q 10/06315* (2013.01); *G06Q 10/04* (2013.01); *G06Q 10/06312* (2013.01); *G06Q 10/109* (2013.01); *G06Q 30/0282* (2013.01)

(58) Field of Classification Search
None
See application file for complete search history.

(56) References Cited

U.S. PATENT DOCUMENTS

| 5,270,920 A | 12/1993 | Pearse et al. |
| 6,356,838 B1 | 3/2002 | Paul |

(Continued)

FOREIGN PATENT DOCUMENTS

| EP | 1057105 B1 | 5/2003 |
| JP | 2010160556 A | 7/2010 |

(Continued)

OTHER PUBLICATIONS

Andy Chun, Hon Wai, and Rebecca Y.M. Wong (Optimizing agent-based meeting scheduling through preference estimation, Engineering Applications of Artificial Intelligence 16 (2003) 727-743)). (Year: 2003).*

(Continued)

*Primary Examiner* — Hafiz A Kassim
(74) *Attorney, Agent, or Firm* — Frost Brown Todd LLP

(57) ABSTRACT

A method and system for scheduling an event are provided. In some embodiments, information regarding the available sessions and facilities is compiled, ranker selection information based on preview sessions is collected, session utility rankings are determined, an event schedule is generated by a computer based at least on session utility rankings and subsequent facility rankings and the event schedule is electronically sent to attendees and other interested parties. In some embodiments, the event schedule can be revised as a result of new or modified session, facility, ranker information and/or attendee information. This general method and system can be applied to problems in various industries.

19 Claims, 11 Drawing Sheets

(51) Int. Cl.
*G06Q 10/0631* (2023.01)
*G06Q 10/109* (2023.01)
*G06Q 30/0282* (2023.01)

(56) References Cited

U.S. PATENT DOCUMENTS

| | | | |
|---|---|---|---|
| 6,409,514 | B1 | 6/2002 | Bull |
| 7,711,591 | B2 | 5/2010 | Wolfe et al. |
| 7,805,107 | B2 | 9/2010 | Shaver |
| 7,822,622 | B2 | 10/2010 | Kaindl et al. |
| 7,890,349 | B2 | 2/2011 | Cole et al. |
| 7,941,354 | B2 | 5/2011 | Breen |
| 8,014,908 | B2 | 9/2011 | Clarke et al. |
| 8,052,426 | B2 | 11/2011 | Snyder et al. |
| 8,214,243 | B2 | 7/2012 | Graham et al. |
| 8,234,150 | B1 | 7/2012 | Pickton et al. |
| 8,401,885 | B2 | 3/2013 | Hannon |
| 8,849,690 | B1 | 9/2014 | Yang et al. |
| 10,074,059 | B1 | 9/2018 | Albro et al. |
| 2001/0014866 | A1* | 8/2001 | Conmy ............... G06F 40/103 705/7.19 |
| 2002/0188490 | A1* | 12/2002 | Kruse ................ G06Q 10/109 705/5 |
| 2003/0036939 | A1 | 2/2003 | Flores et al. |
| 2003/0065544 | A1 | 4/2003 | Elzinga et al. |
| 2003/0236796 | A1 | 12/2003 | Faster et al. |
| 2004/0009461 | A1* | 1/2004 | Snyder .................. G09B 7/02 434/350 |
| 2004/0073447 | A1 | 4/2004 | Stuart et al. |
| 2004/0115596 | A1 | 6/2004 | Snyder et al. |
| 2006/0010023 | A1* | 1/2006 | Tromczynski ......... G06Q 10/10 705/7.19 |
| 2006/0047557 | A1* | 3/2006 | Bieselin ............. H04L 12/1818 705/7.18 |
| 2006/0242154 | A1* | 10/2006 | Rawat .................. G06F 16/168 |
| 2006/0282302 | A1 | 12/2006 | Hussain |
| 2007/0174004 | A1 | 7/2007 | Tenzer et al. |
| 2007/0300163 | A1* | 12/2007 | Alford ............... G06Q 10/1093 715/764 |
| 2008/0140488 | A1* | 6/2008 | Oral .................. G06Q 10/1093 705/7.18 |
| 2008/0208664 | A1 | 8/2008 | Parija et al. |
| 2009/0024442 | A1 | 1/2009 | Brink et al. |
| 2009/0320047 | A1* | 12/2009 | Khan ..................... G06F 9/542 719/318 |
| 2009/0327227 | A1* | 12/2009 | Chakra .................. G06Q 10/10 709/204 |
| 2010/0017216 | A1* | 1/2010 | Chakra ............... G06Q 10/1095 705/1.1 |
| 2010/0088144 | A1* | 4/2010 | Collet ............. G06Q 10/063116 705/7.18 |
| 2011/0112854 | A1 | 5/2011 | Koch et al. |
| 2012/0136671 | A1 | 5/2012 | Alt et al. |
| 2012/0239451 | A1* | 9/2012 | Caligor ................. G06Q 10/00 705/7.21 |
| 2012/0253868 | A1 | 10/2012 | Ach et al. |
| 2013/0066647 | A1 | 3/2013 | Andrie et al. |
| 2013/0191836 | A1* | 7/2013 | Meyer ............ G06Q 10/063114 718/103 |
| 2013/0226645 | A1* | 8/2013 | Renaghan .......... G06Q 10/1095 705/7.19 |
| 2013/0230843 | A1 | 9/2013 | Casey |
| 2013/0304655 | A1 | 11/2013 | Johnston et al. |
| 2014/0039906 | A1 | 2/2014 | Wang et al. |
| 2014/0172483 | A1* | 6/2014 | Bellers ................ G06Q 10/025 705/7.19 |
| 2015/0039336 | A1 | 2/2015 | Mayer et al. |
| 2015/0058057 | A1 | 2/2015 | Egan et al. |
| 2015/0120527 | A1 | 4/2015 | He |
| 2015/0213222 | A1 | 7/2015 | Amarasingham et al. |
| 2015/0332196 | A1 | 11/2015 | Stiller et al. |
| 2016/0063192 | A1* | 3/2016 | Johnson ................. G16H 40/20 705/2 |
| 2016/0247413 | A1 | 8/2016 | Baker et al. |
| 2017/0068926 | A1 | 3/2017 | Eom et al. |
| 2017/0083872 | A1* | 3/2017 | Blomberg .......... G06Q 10/1095 |
| 2018/0225753 | A1 | 8/2018 | Wilmsen et al. |
| 2018/0285527 | A1 | 10/2018 | Abadir |

FOREIGN PATENT DOCUMENTS

| | | |
|---|---|---|
| JP | 2011048505 A | 3/2011 |
| JP | 2015210560 A | 11/2015 |
| JP | 2017518592 A | 7/2017 |
| WO | 2014179861 A1 | 11/2014 |
| WO | 2015150919 A2 | 10/2015 |
| WO | 2018138711 A9 | 2/2019 |

OTHER PUBLICATIONS

International Search Report and Written Opinion dated Jan. 7, 2020 for International Patent Application No. PCT/CA2019/051552.
Extended European Search Report dated Mar. 14, 2022 for European Patent Application No. 19878631.1.
Office Action dated Jul. 5, 2022 for Indian Patent Application No. 202117017831.
Office Action dated Jan. 31, 2023 for Japanese Patent Application No. 2021-524400.
Office Action dated Oct. 6, 2022 for Australian Patent Application No. 2019370634.
Office Action dated Jan. 5, 2023 for Canadian Patent Application No. 3,117,237.

* cited by examiner

METHOD AND SYSTEM FOR ORGANIZING EVENTS

This application claims the priority benefit, under 35 U.S.C. § 119(e), of U.S. Application No. 62/754,328, which was filed on Nov. 1, 2018, and is incorporated herein by reference in its entirety.

TECHNICAL FIELD

The present disclosure is related to the field of event planning, in particular, computer-implemented methods and systems for organizing events.

BACKGROUND

The event industry is large and impacts many people. A recent study by PricewaterhouseCoopers found that in 2012, 225 million people attended over 275,000 conferences and events (and $280 billion was spent on these events) in the United States alone. It has been estimated that the meeting and event industry contributes more to the US GDP than air transportation and the motion picture industry. Professional membership and licensing organizations often demand a minimum number of learning hours each year from members, which can be satisfied by attending conferences. Additionally, events dedicated to a particular field or profession provide beneficial networking opportunities. People who attend these events want to ensure they are getting the most value for their money and those running the event want to provide this value economically.

The preceding decades have seen a plethora of computerized tools to aid planners with the complex task of event planning. However, these solutions have primarily been designed to improve the speed of the pre-existing and underlying process, not fundamentally changing the dynamics of how an event functions. In particular, known planning tools presuppose that an event's schedule and layout of sessions and rooms must be set before the event.

Current methods that assist with event planning focus on setting an event's schedule, budget, speaker list and other information before the event. Setting the schedule before the event necessarily demands that rooms must also be booked for the corresponding sessions in the schedule before the event, meaning that the space occupied by the activities of a conference is not examined to improve efficiency. Since spaces are selected prior to a conference beginning, how much space a conference needs for each session is usually based upon 'best guess' forecasting of crowds. However, the space rented for a widely attended conference is one of the conference's largest expenses.

To counter the uncertainty inherently demanded by booking rooms in advance, it is common practice in event planning to overbook space, so that conference attendees may unpredictably choose sessions and the rooms for these sessions will not become overfilled. For example, a conference selling a maximum of 300 tickets and having three breakout sessions occurring simultaneously might book three rooms, each with a capacity of 150 people, for each of these sessions. This means that, no matter what sessions the attendees choose to attend, there will be a minimum of 150 seats total which are left vacant, though still being rented or maintained at a cost.

Some solutions designed to address the problem of overbooking room space may attempt to confirm attendee's selections of breakout sessions well before the date of the conference. However, attendee responses are usually insufficient to modify the standard procedure of overbooking space in advance, for example because either a small number of attendees respond, or they respond past the deadline for booking space.

Additionally, problems can arise when individuals sign up for a conference to fulfill their continuing education requirements but skip sessions or leave early due to a dislike of the session or the presenter.

Therefore, there is a need to improve the efficiency and effectiveness by which events are organized.

There is a similar need in various other industries to improve the efficiency and effectiveness of how facilities are used. For example, in the healthcare industry many hospitals and healthcare facilities in the developed world still use a pen and paper or spreadsheet form of scheduling, which involves manual entry, communication and estimation by staff. This also means that real time information is not included; that buffers of space and resources must be maintained in order to facilitate emergency care and protect against malpractice lawsuits; and that the source of scheduling information is not centralized. This can lead to underutilization, medical mishaps and loss of life. In 2016, the average US hospital reported a utilization rate of only 65.5%, meaning that, at any given time, 34.5% of their facility was sitting unused. This is despite an urgent need for medical care going under serviced in the general population. $55.6 billion dollars is spent annually to defend and minimize the damage of medical malpractice in the United States. Therefore, there is need for a system which can quickly, efficiently and dynamically assign the scheduling of patients based on real time information, as well as notify all users in a unified system of the patient schedule.

This is similarly the case for corporations wanting to lease or rent space. Developments such as malls or retail and commercial complexes are often developed by a single development company who want their spaces rented quickly and to not sit empty for long periods of time. There are thousands of these real estate holding and/or management companies currently in existence. They most often manage vast plots of land and property in their operating regions, and therefore have a need to efficiently and quickly match tenants to a wide variety of spaces. In turn, a chain or franchised corporation will often identify a new regional market to move in to, and will look for spaces in that market that fit certain requirements. This is often done from an 'afar' main office, and, therefore can be costly to send someone to look at spaces in a city they are not familiar with. Both the owner and the tenant's goals can be more effectively met with a lesser overall cost by scheduling leases in consideration of all requests and in consideration of the owner's total land and/or property holdings and their leasing schedule. Therefore there is also a need to efficiently and quickly match tenants to spaces.

In the airline industry airlines often carry significant unused capacity in their off season. Due to the high operating costs of airlines, this causes significant lost profit. In the last decade alone, we have seen multiple record-breaking bankruptcies of airlines—for instance, Thomas Cook—relating most strongly to the inability to match capacity to ticketing. To compensate, airlines often try to anticipate cancellation rates and double book flights in the 'on season', causing further cost of rescheduling and customer service actions if the predictions are wrong.

Presently, airline tickets are booked directly by the consumer, wherein the consumer directly chooses the flight, airline, and even the seat on a first-come, first-serve basis. This generates confusion and stress for the average consumer when having to compare thousands of options. To compensate for the complicated process, many airlines and ticketing services have in fact further complicated the user experience by using complex financial algorithms to modify the price of tickets constantly based on demand. This, while trying to compensate for lost revenue for the inherently risky airline business, only further complicates the user experience and continues the cycles of double booking, cancellation, over and underused capacity, and the like, by clouding information relating to the schedule, capacity and true demand. This entire process increases costs for the airline and customers and can create frustration for customers. Therefore, there is a need to provide a more simplified method of selling airline tickets, which is able to more effectively match capacity to demand given limited selection and reduces the effort required from the consumer.

In school systems, whether it be a high school, university or college, the registration systems used are often based upon predicting the demand on certain classes. Many schools still use a registration system primarily driven by manual entry of data and manual calculations performed by employees. Due to these factors, nearly all schools of any meaningful size experience a significant burden in the initial weeks of a term, requiring that large complexes of emergency changes be made manually to schedules, to ensure that students meet minimum program requirements and graduate on time. Not only are these requirements often not met by the current system, but, even after this process, a significant number of students and staff are dissatisfied with their schedule for the ensuing term. Therefore, there is a need to provide a system that can be used by school administrators that would efficiently and effectively provide a schedule that provides a greater satisfaction to students and ensures that they meet their minimum graduation requirements prior to the first day of school to avoid the costly and time consuming work of rearranging schedules and addressing situations where students do not have the required course to graduate.

The scheduling method, or linking of facilities and sessions, that occurs in many industries is complex, costly, time consuming, inefficient and often provides a schedule that is unsatisfactory to those who ultimately use it. Current methods typically focus on ensuring that a schedule can fit perfectly within certain parameters, based on a forecasting of users' specific wants and needs. However, this is a vastly more complex problem to solve, and, when based only on prescriptions and predictions, often provides little added value in comparison to the immense added effort. Therefore, there is a need for a system that can develop a schedule effectively, efficiently and in a timely fashion and that is more satisfactory to end users and event coordinators and that can be updated as information and parameters change.

SUMMARY

Methods and systems for event organization are provided herein. In some embodiments a computer-implemented method of organizing an event is provided that includes: compiling session and facility information for at least two sessions and facilities; receiving ranking information from rankers based on at least one preview session; determining a utility ranking for at least two sessions wherein the utility ranking is based at least on part on the ranking information; selecting a session for scheduling; tentatively selecting a facility for linking to the selected session; linking the selected session to the tentatively selected facility; scheduling the linked session and facility into an available event time slot; repeating the steps of selecting a session onwards until all sessions are linked to a facility and scheduled into an event time slot; generating an event schedule; and sending the event schedule to at least one attendee or organizer.

In some embodiments a computer-implemented method of organizing an event is provided that includes: compiling session and facility information for at least two sessions and facilities; receiving ranking information from rankers based on at least one preview session; determining a utility ranking for at least two sessions wherein the utility ranking is based at least in part on the ranking information; selecting a session for scheduling; tentatively selecting a facility for linking to the selected session; linking the selected session to the tentatively selected facility; scheduling the linked session and facility into an available event time slot; determining if there are any unscheduled concurrent time slots and if so selecting a concurrent session for scheduling; repeating steps of tentatively selecting a facility to determining if there are any unscheduled concurrent time slots until there are no unscheduled concurrent time slots; repeating the steps of selecting a session for scheduling onward until all sessions are linked to a facility and scheduled into an event time slot; generating an event schedule; and sending the event schedule to at least one attendee or organizer.

In some embodiments a system comprising at least one processor configured to implement the following steps is provided: compiling session and facility information for at least two sessions and facilities; receiving ranking information from rankers based on at least one preview session; determining a utility ranking for at least two sessions wherein the utility ranking is based at least in part on the ranking information; selecting a session for scheduling; tentatively selecting a facility for linking to the selected session; linking the selected session to the tentatively selected facility; scheduling the linked session and facility into an available event time slot; repeating the steps of selecting a session onwards until all sessions are linked to a facility and scheduled into an event time slot; generating an event schedule; and sending the event schedule to at least one attendee or organizer.

In some embodiments a system comprising at least one processor configured to implement the following steps is provided: compiling session and facility information for at least two sessions and facilities; receiving ranking information from rankers based on at least one preview session; determining a utility ranking for at least two sessions wherein the utility ranking is based at least on part on the ranking information; selecting a session for scheduling; tentatively selecting a facility for linking to the selected session; linking the selected session to the tentatively selected facility; scheduling the linked session and facility into an available event time slot; determining if there are any unscheduled concurrent time slots and if so selecting a concurrent session for scheduling; repeating steps of tentatively selecting a facility to determining if there are any unscheduled concurrent time slots until there are no unscheduled concurrent time slots; repeating the steps of selecting a session for scheduling onward until all sessions are linked to a facility and scheduled into an event time slot; generating an event schedule; and sending the event schedule to at least one attendee or organizer.

In some embodiments a subset of sessions having the lowest rankings by those forecasted to attend the scheduled concurrent session(s) can be identified and the selected concurrent session can be the session in this subset that has the highest utility ranking.

In some embodiments the selected session is the session with the highest utility ranking remaining.

In some embodiments the utility ranking is also based on modification factors applied to the ranking information.

In some embodiments the modification factor includes at least a degree modification and in other embodiments modification includes at least a prerequisite modification.

In some embodiments the tentatively selected facility is the highest ranking facility remaining, which can be determined based on session requirements rankings, facility rankings or both.

Some embodiments further comprise resolving any conflicts prior to linking the selected session with the tentatively selected facility.

Some embodiments further comprise revising the generated schedule based on additions, modifications or changes to session, facility or ranking information, and sending the revised schedule to at least one attendee or organizer.

In some embodiments a buffer constant is applied to modify the sessions available to be selected to schedule.

Some embodiments further comprise approving the generated event schedule prior to sending the event scheduled to at least one attendee.

In some embodiments the event schedule is sent electronically to at least one attendee or organizer.

Some embodiments further comprising receiving post-session feedback from at least one ranker or attendee, which can include an attendee or ranker ranking a presenter. In some embodiments the post-session feedback can for part of the basis for determining the presenters monetary compensation.

In some embodiments some or all of the information collected during the performance of any of the methods described herein is used to develop another event.

In some embodiments a computer-implemented method of organizing an event, where one session is forecasted to have an attendance greater than the capacity of the largest facility is provided that includes: compiling session and facility information for at least two sessions and facilities; receiving ranking information from rankers based on at least one preview session; determining a utility ranking for at least two sessions wherein the utility ranking is based at least in part on the ranking information; selecting a session for scheduling; forecasting the attendance of the selected session; tentatively selecting a facility for linking to the selected session; linking the selected session to the tentatively selected facility; scheduling the linked session and facility into an available event time slot; determining if there is a forecasted over attendance of the selected session; determining if there are any unscheduled concurrent time slots and selecting a concurrent session for scheduling wherein if the previously selected session has a forecasted over attendance the concurrent session is selected which has an estimated pull away number similar to the forecasted over attendance; repeating the steps of forecasting attendance at the selected session to determining unscheduled concurrent time slots and selecting a concurrent session until there are no unscheduled concurrent time slots; repeating the steps of selecting a session for scheduling onward until all sessions are linked to a facility and scheduled into an event time slot; generating an event schedule; and sending the event schedule to at least one attendee or organizer.

Broadly stated, in some embodiments a system for organizing an event is provided, the system comprising: at least one processor; a database coupled to the at least one processor that receives and stores event information including at least session information and facility information, and which has instructions stored therein, which when executed by the processor, cause the processor to generate an event schedule based on the event information wherein the event information is at least a utility ranking, session information and facility information; and a network interface in communication with the database, which functions to publish the event schedule.

Some potential advantages of the present methods and systems are that it improves overall event satisfaction.

Broadly stated, in some embodiments a method of developing an event is provided herein, the method comprising: collecting event information from at least a first event; storing the event information in a database; selecting the event information of interest; and developing a second event based at least in part on the selected event information of interest.

One advantage of using the database of event information in the development of other events may be that these new events could cater to different groups of attendees based on grouping attendees based on their feedback and/or attendance. Another advantage may be that these new events are structured in a more attractive fashion based on the event information. Session selection at future events based on reviewing the event information may result in a listing of sessions that are more attractive to attendees.

DETAILED DESCRIPTION OF EMBODIMENTS

Figure 1:
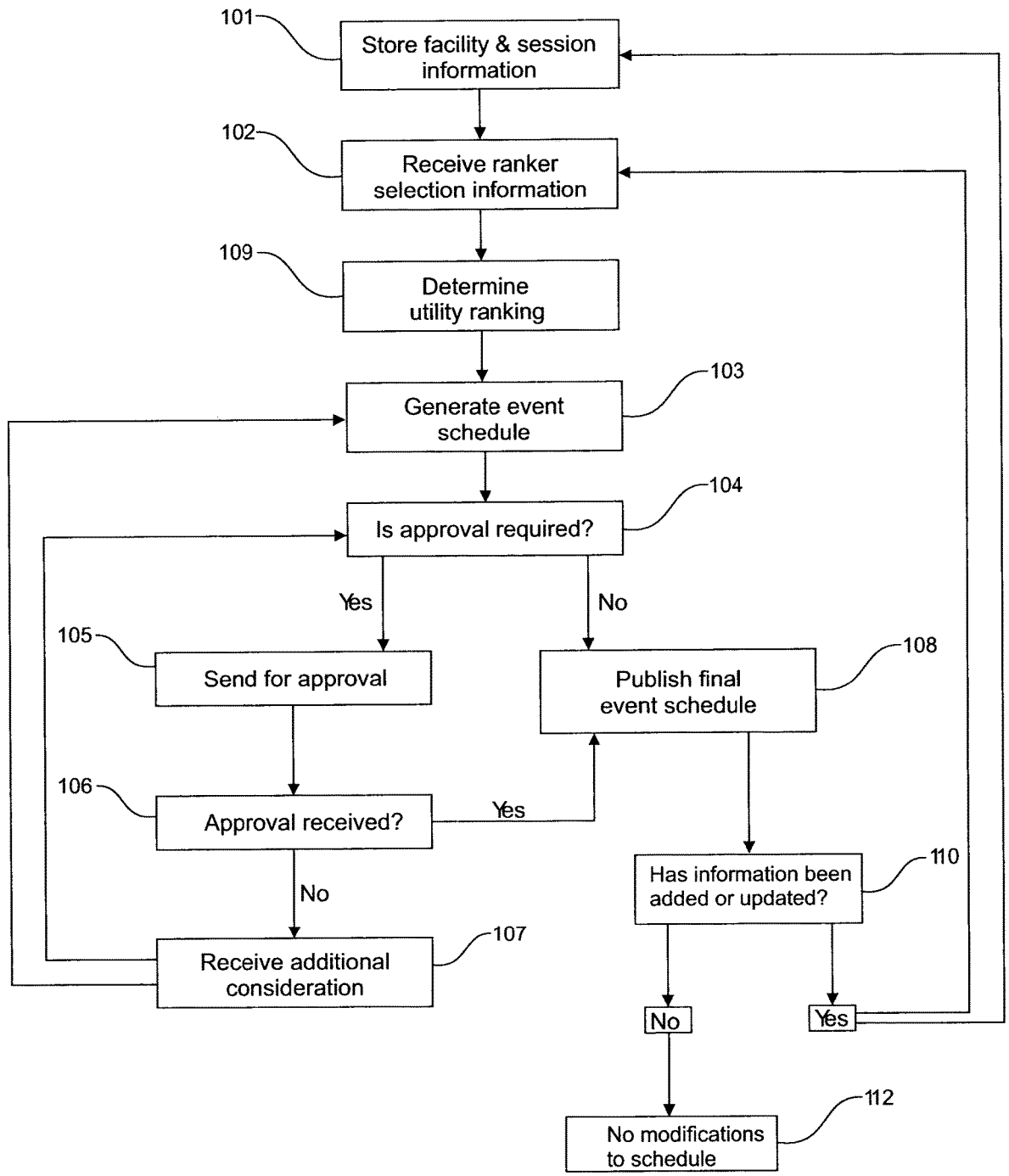
FIG. 1 is a diagram of an embodiment of the general method of scheduling an event.

In the following description, certain specific details are set forth in order to provide a thorough understanding of various aspects of the disclosed subject matter. However, the disclosed subject matter may be practiced without these specific details.

Unless the context requires otherwise, throughout the specification and claims that follow, the word "comprise" and variations thereof, such as "comprises" and "comprising" are to be construed in an open, inclusive sense, that is, as "including, but not limited to."

Reference throughout the specification to "one embodiment", "an embodiment" or "in some embodiments" means a particular feature, structure, or characteristic described in connection with the embodiment is included in at least one embodiment. Thus, the appearance of the phrases "in one embodiment", "in an embodiment" or "in some embodiments" in various places throughout the specification are not necessarily all referring to the same aspect. Furthermore, particular features, structures, or characteristics may be combined in any suitable manner in one or more aspects of the present disclosure.

For the purpose of the present description and of the appended claims, except where otherwise indicated, all numbers expressing amounts, quantities, time frames, percentages, and so forth, are to be understood as being modified in all instances by the term "about". Also, all ranges include any combination of the maximum and minimum points disclosed and include any intermediate ranges therein, which may or may not be specifically enumerated herein.

For the purpose of the present description and of the appended claims, the words "a" or "an" should be read to include one or at least one and the singular also includes the plural unless it is obvious that it is meant otherwise. This is done merely for convenience and to give a general sense of the invention.

Methods and systems for producing an event schedule by linking one or more facilities with one or more sessions and scheduling them in a time slot using a best fit model are described. The general method and system is described in detail below followed by further descriptions of various embodiments and examples of how the method and system may be implemented in various industries.

The general method described herein relies on determining and using a "session's aggregated ranking", often referred to herein as the "utility ranking", based on at least information regarding at least two sessions. In some embodiments the application of the modification factor to the individual ranking can occur prior to aggregation and in other embodiments the modification factor to the individual ranking can occur after aggregation. In some embodiments the sessions have only one attendee and therefore the utility ranking is directly linked to that attendee.

It is intended that the utility ranking represent the importance or usefulness of the session to the overall event, for example by bringing the most satisfaction to the most number of attendees. It is not intended to simply represent the overall preference of attendees, nor is it intended to be simply an indication of the number of people who want to attend a session or a popularity ranking of a session. Rather, the utility ranking is intended to represent the wants and needs of the event overall and the desire for the organizer to have the greatest number of the most valued attendees be the most satisfied. For example, the method and system are directed to providing the most attendees as possible with their ideal schedule, meaning a schedule that would allow them to attend as many sessions as possible which were highly ranked. More specifically, an ideal schedule refers to the list of sessions ranked the most highly in respect to each individual attendee (taking into consideration both their ranking, and any ranking modification made on their behalf or assigned to them), the number of said sessions being equal to the number of time slots that each individual attendee could attend during the course of the event, regardless of those session's relative order unless otherwise demanded by the nature of the sessions, which the given attendee therefore implied or expressed they would wish to attend at the event.

With reference to FIG. 1, in step 101, information about the facility can be stored on a computer. In some embodiments the information can include any number of characteristics of the facility such as capacity, size, type, and functionality of the facility. As used herein, a facility refers to the location where the attendee will be scheduled at a certain time, whereas the term venue encapsulates or encompasses all facilities available to be linked at an event. For example, in the healthcare example, the facilities are the rooms where treatments take place and the venue includes all hospitals and other healthcare locations where a facility is located.

In some embodiments the event time frame available for scheduling can also be stored on a computer in step 101. In some embodiments the event time frame may be a fixed schedule, for example when used for a conference, which has a fixed duration, or in a school, where there is a start and end to a term. In some embodiments the event time frame is an indefinite period, for example when used in industries that continually operate, such as hospitals, airlines and theme parks.

At step 101 session information can also be stored. For example, organizers can also input session information, meaning the set parameters for a particular session which may include, for example, specific facility requirements and/or facility preferences. This session information is defined through a set of rankings and referred to herein as "requirements rankings".

Prior to the creation of the schedule there is a preview which provides rankers with preview information about each available session. After viewing the preview the rankers can submit their ranking of the applicable session(s). A ranker can be an organizer, an attendee or any other party who views the preview. At step 102 the computer receives the ranker selection information.

It is contemplated that in some embodiments the ranking provided by the ranker may be modified in accordance with certain variables associated with the ranker, for example based on holding a certain membership, having a certain loyalty status or other similar characteristics.

The ranking information from the rankers along with the any modification factors are combined to determine the overall session rankings, referred to herein as the utility ranking 109. In examples where one attendee is capable of attending a session, for example in the airline and theme park applications, the ranking provided by the ranker equals the utility ranking 109, subject to any modifications. Alternatively, in examples where multiple attendees can attend a session the ranking submitted by each individual ranker is added together to determine the utility ranting 109, subject to any modifications. The utility ranking for a session can be used to determine which session should be scheduled next.

Once all the rankings, facility and session information has been stored and received an event schedule is generated, at step 103.

In order to generate a schedule the session and facilities need to be linked together and assigned to a time slot, or time block. There can be multiple time slots or time blocks that run concurrently, which are referred to herein as concurrent time slots or time blocks or time slots or time blocks in a row.

The process used to link facilities and sessions is referred to as the "best fit" method. In some embodiments the best fit method can be described as "best to best" and in some embodiments the best fit method can be described as "best to the best of the worst of best".

Figure 2:
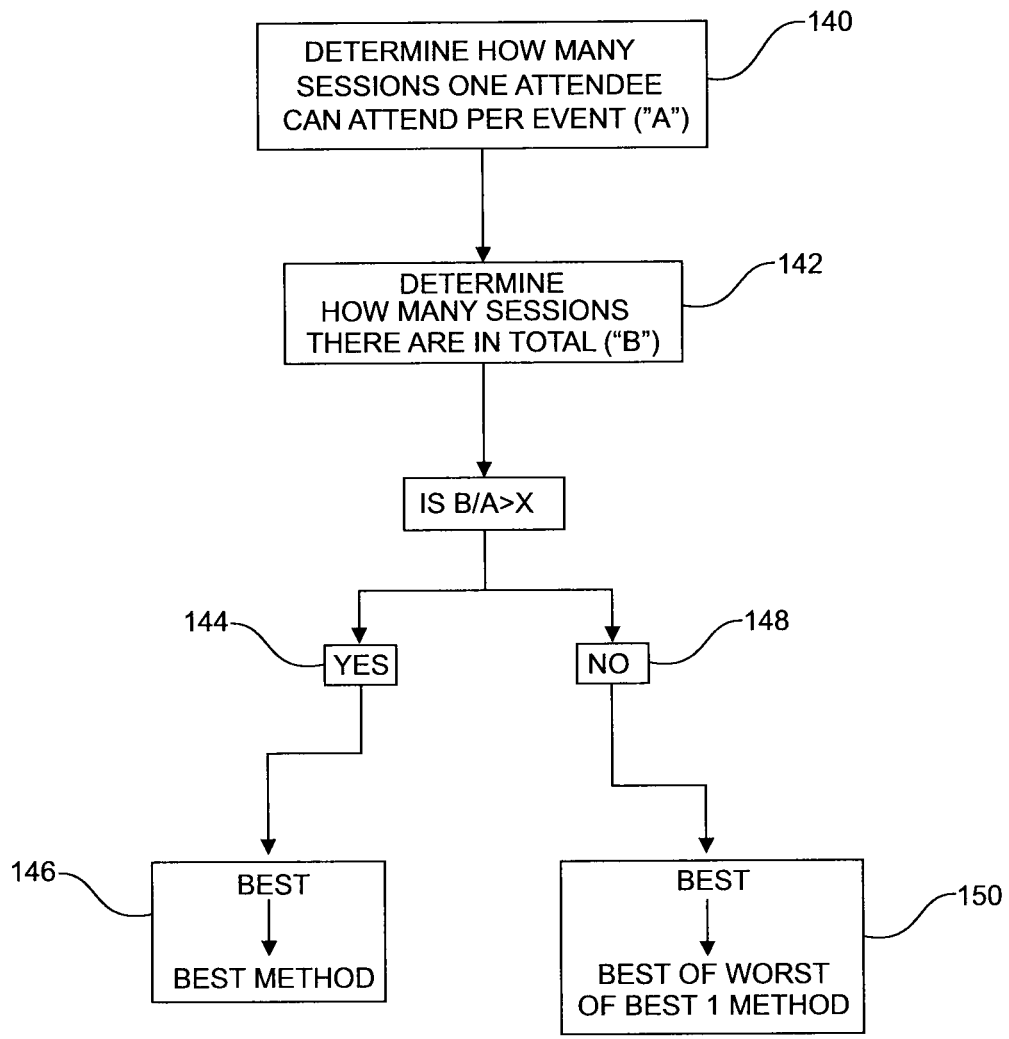
FIG. 2 is a diagram of the decision process used to determine which best fit method to use in scheduling an event.

With reference to FIG. 2, an example is provided of a process to determine which best fit method to use based on the number of attendee choices per event time slot there are available. The system determines how many full sessions an attendee can attend during the event (or how many time rows there are at the event) (A) 140 and how many sessions there are in total (B) 142. The ratio of B/A is determined and represents the number of options any individual attendee will have to attend sessions in a single time row. For example, if there are 6 time rows and a total of 18 sessions, each attendee has a choice of 3 sessions per time row, assuming they are present for the entirety of the event.

If the number of choices an individual attendee has per time row is small it is less likely they will be able to attend their most desirable sessions using the best to best method. Alternatively, if there are a large number of sessions per row then it is more likely that an attendee will be able to identify and attend a session they are interested in.

In FIG. 2, X represents a constant that is determined based on the particular situation or industry in which the method is being applied. For example, if the method is being used by a school, if an attendee (student) has 3 classes (sessions) running concurrently that they can choose from this would likely be too little to use the best to best method and satisfy a large number of the students, whereas if they had 4 classes to choose from the best to best method may be sufficient. Therefore, in this case X would be best set at 4. If the ratio of B/A is greater than the value of X 144, the best to best method 146 may be used. If the ratio of B/A is not greater than the value of X 148, the best to best of worst of best method may be used 150.

In general, the greater the number of sessions there are per time row the more likely the preferred best fit method will be best to best. In contrast, the closer the number of sessions per time row is to 1 the more likely the preferred best fit method will be best to the best of the worst of best. In some embodiments it may be that both best fit methods should be run and then the final schedule be determined by the organizer. In some embodiments the overall method may be run multiple times in succession, using the best to best method one time and the best to best of worst of best another time.

In order to generate a schedule from the utility rankings, in some embodiments the first session linked to a facility is the one that has the highest utility ranking. The word linking with respect to a session and facility refers to the process of scheduling or pairing a session and a facility together. The linking occurs also within the overall schedule of the event, meaning that the session and facility are linked for a particular time slot. Herein time slot can be interchangeable with time block, time period and the like.

The facilities can also be ranked, however the facility ranking is based on the requirements rankings for the session with the highest utility. The requirements ranking is used to match a session to the facility which is most suitable for that session. The facility with the highest ranking facility with respect to the referenced session is selected. For the first linkage of session and facility there should be no conflicts for the attendee, as there is no concurrent session scheduled yet, and therefore the session with the highest utility ranking is linked to the highest ranked facility and scheduled into a time slot.

If there are other sessions to be scheduled, then the method continues with identifying the session with the highest utility ranking of a) all the remaining unscheduled sessions if using the best to best method; or b) a specific subset of unscheduled sessions if using the best to best of the worst of the best method. This process is further described below with reference to FIGS. 3-7.

Once all sessions are scheduled, the computer can generate a draft event schedule 103. If no approval of the draft event schedule is required at step 104, the final event schedule is published 108.

If approval is required at step 104, the computer generated event schedule may be sent to the event organizer 105 to be reviewed prior to sending it to the attendees or any other party. In some embodiments approval of the draft event schedule may not be received at step 106 and then modifications to the draft event schedule may be made prior to sending the final event schedule to attendees and other parties. Modifications may be made manually by the event organizer by providing, removing or amending information previously considered or by selecting additional factors to consider 107 and having the computer generate a new event schedule accounting for all the selected factors.

In some embodiments approval of the draft schedule is received at step 106 and then the final event schedule can be published 108.

As referred to herein, the final event schedule is the event schedule that is sent to the attendees and other parties. Any other version of the event schedule may be referred to as a draft event schedule. Additionally, any reference to the "event schedule" generally may be a reference to the final event schedule or a draft event schedule.

Once the event schedule is generated, or in the case where approval is required, once it has been approved by the event organizer, the final event schedule is published 108. In some embodiments the publication 108 can be the sending out of the final event schedule to attendees and other parties. This can be accomplished, for example, by wirelessly sending out the event schedule through an event application, event website or event email communication. In some embodiments the event schedule is also sent to other individuals involved with the event or those who may want or need to know the event schedule, for example, hosts, speakers, organizers, building managers, staff managers, event coordinators, sponsors, volunteers and/or service providers or any combination of these groups of people.

At any step in the method where it may be appropriate to reconsider the factors assessed to generate the event schedule, those factors can be modified. For example, after additional consideration is received 107 or after the final event schedule is published 108, the event organizer may amend the factors considered to generate the event schedule and an amended event schedule may be generated.

In some embodiments it may be useful or necessary to amend the event schedule during the event when information is added, updated or otherwise modified 110. In some embodiments the schedule may be updated periodically at regular or irregular intervals or in real time to provide everyone involved with a new, updated schedule as information is modified or added, for example where new attendees and ranking information is stored and/or new sessions need scheduling. Therefore, it is contemplated that the final event schedule can be adapted or modified during the event based on any number of factors including a speaker no longer being able to attend the event, a facility becomes unusable, new ranking information being received from attendees (for instance those attendees who came late to the event or if attendee selection information was not originally delivered due to a technical error), an unforeseen reduction in resources is experienced (i.e. computer resources), an emergency which prevents the venue or staff from functioning normally, additional sessions being required, modifications to previously scheduled sessions, new or updated information about sessions, the attendees (or forecasted attendees) and/or facilities or any combination thereof.

In the event that the event schedule is in need of modification during the event the new or altered factor(s) can be added or changed and a computer generated modified final event schedule can be produced using the same method previously described. This modified final event schedule can then be sent wirelessly to attendees and/or to other individuals involved with the event or those who may want or need to know the event schedule.

If no information is added, updated or modified no changes to the schedule are made 112.

In some embodiments when information is added, modified or updated 110 after the final schedule is published, a buffer constant can be incorporated so that there is adequate time to inform attendees and other parties about any changes or modifications to the schedule. More specifically the buffer constant would be a number which could be or could reflect an amount of time that must elapse in the schedule, starting from the current time, before any modification of the schedule can be made. In some embodiments the buffer constant can be the same for all sessions. In some embodiments the buffer constant can be variable for each session or for different types of sessions. For example, where a new session of a high utility ranking, whose information has just been received, needs to be scheduled this could result in changes to the current schedule. However, the new session cannot be accommodated immediately. There is a minimum period of time that must elapse before the new session can be accommodated, which is represented by the buffer constant. In one example, if the buffer constant is set at 1 hour and a new request having the highest utility ranking is inputted into the computer at 10:00 am, the session would not be linked to a facility in the schedule any earlier than 11:00 am.

It is anticipated that these calculations will occur by way of a computer program and system. This is especially important when dealing with events that are more complex and involve more attendees, facilities, session, previews and rankings. In order for a timely and usable schedule to be produced and distributed, and updated in the case of modifications being made to any of the variables, the method must be performed on a computer system.

Figure 3:
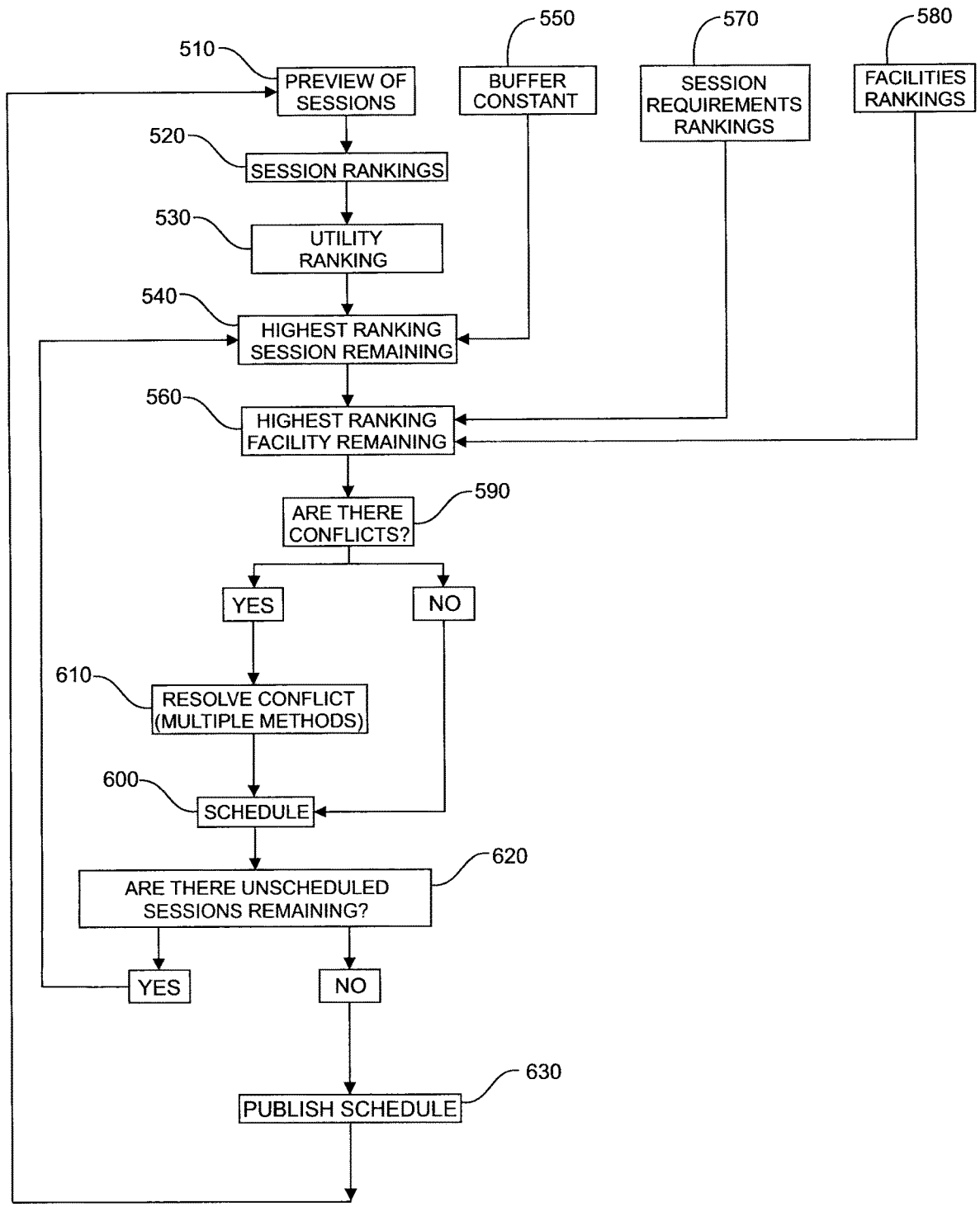
FIG. 3 is a diagram of an embodiment of the method to generate an event schedule.

With reference to FIG. 3, after the preview of sessions 510 the sessions are ranked by the rankers 520. In some embodiments these rankings are the same as the utility ranking 530. In some embodiments the session rankings 510 are modified prior to determining the utility session rankings 530. The highest ranking session remaining 540 is selected, having considered any buffer constant that may have been set 550. Next the highest ranking facility with respect to the selected session is identified 560, taking into account the session requirement rankings 570 and the facility rankings 580. Once a facility is tentatively identified the system identifies any conflicts that may exist 590. If there are no conflicts then the session is scheduled in or linked to the facility 600. If there are any conflicts identified then they are resolved 610 before the session can be scheduled in or linked to a facility 600 at a particular time slot. Once the session is scheduled if there are no remaining sessions to schedule at step 620 then the schedule is published 630, subject to any necessary approvals (not shown). However, if there are still sessions remaining the process returns to step 540.

In the best to best method, the first session selected at 540 is the overall highest ranked session. Once the overall highest ranked session is scheduled 600, the next session to be selected to be linked or scheduled at 540 is the second overall highest ranked session (aka the highest overall ranked session remaining). In the best to best method the next session selected at 540 is always the highest overall ranked session remaining.

Figure 4:
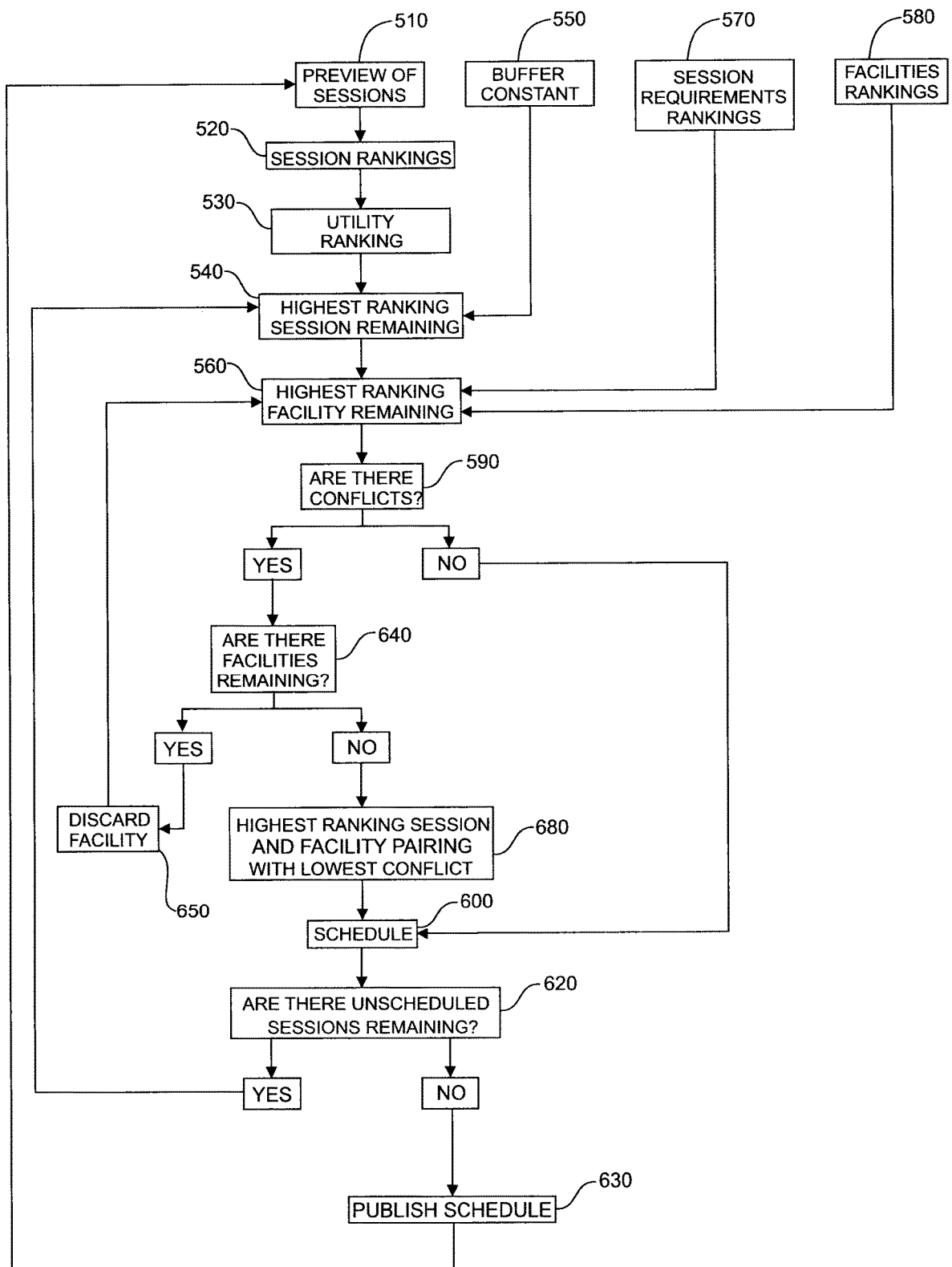
FIG. 4 is a more detailed diagram of FIG. 3, showing a first method of resolving a conflict.
Figure 5:
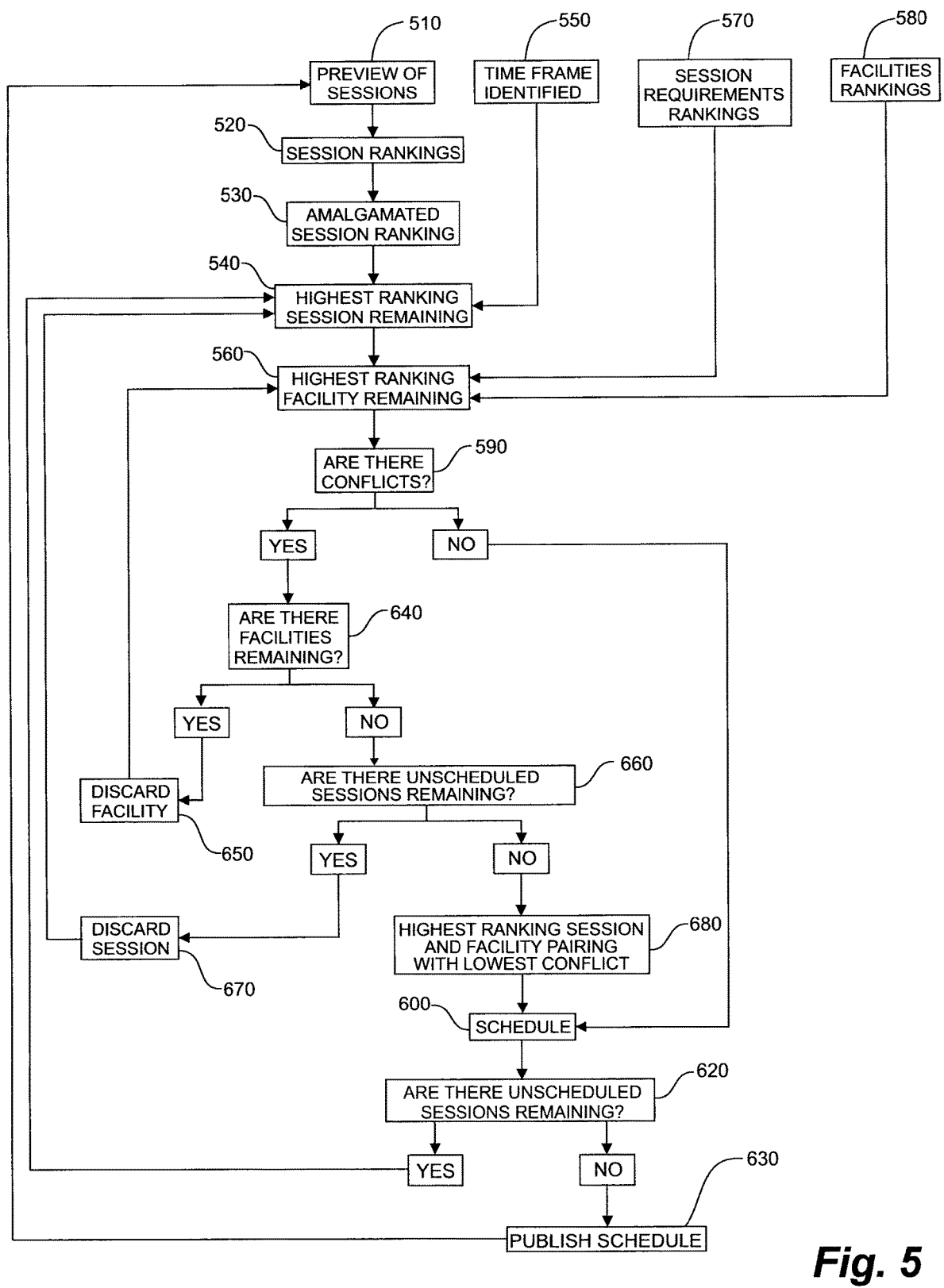
FIG. 5 is a more detailed diagram of FIG. 3, showing a second method of resolving a conflict.

FIGS. 4 and 5 are more detailed diagrams of FIG. 3 showing examples of how conflicts at step 610 may be resolved. As is described below with reference to FIGS. 3-5 the remaining facilities are ranked based on the ranking requirements of the session to be linked and the highest ranking facility is determined. This session-facility pairing is then tentatively linked or scheduled in a time slot. It is then determined if there are any sessions scheduled to run concurrently to or overlap with the tentatively linked session. It is anticipated that in some applications there will be at least one concurrent session which an attendee could attend (for example at a conference there will potentially be more than one session scheduled in any given time row which an attendee could theoretically attend). If concurrent sessions are available to an attendee, an analysis of potential conflict for the attendee based on their rankings is determined. More specifically, a conflict can occur when an attendee is forecasted as wanting to attend two sessions that run concurrently.

If a conflict is detected, the tentative linkage is discounted and the same session is then tentatively linked with the next highest ranking facility. This occurs until there are no conflicts between any session-facility pairings and the tentative session-facility link at which point the link is no longer tentative and the session is schedules for that facility. Alternatively, where it is not possible to schedule concurrent sessions without conflict, the session causing the least amount of conflict can be scheduled.

For instance, if the next highest ranking session is selected and linked to a facility, the system may tentatively schedule the session in a remaining time block for which said facility is available. Finding that, in this time block, said session will run concurrently to another already scheduled session, the system would then check for conflicts. In some embodiments one method to check for conflicts can be to identify the given session to be scheduled, as well as any sessions that have already been scheduled and will run concurrently to the tentative time block being considered for the current session, and to reference the ideal schedules of the rankers and/or attendees to determine if any two or more of these sessions appear in any one attendee/ranker's ideal schedule. The number of attendees/rankers for which more than one of the sessions appears in their ideal schedule is the number of attendees/rankers for which placing the given session in this time block and facility will cause a conflict. This could, for example, be recorded as the conflict number were the given session to be scheduled in the given facility and time block. In some embodiments the conflict number can be recorded for each tentative linking of a facility, session and time block each time said combinations were checked for conflicts. In some embodiments where a situation could not be met where no conflicts would be produced, then the recorded conflict numbers may be used to determine the linking of time block to facility to session which produced the lowest conflict number during the tentative linking process, select this time block, facility and session combination, and schedule it before moving on to finish the full process.

In certain embodiments, the system could be set to check the available time blocks with the linked facility, and, if there were no time blocks which generated no conflict, to select the time block, facility and session linking having the lowest conflict number at this point. In other embodiments, the system could be directed to discard the linked facility at this point 650, and select the next highest ranking facility in respect to the session 560, then to check for conflicts in all of the available time blocks for said facility. In other embodiments, the system may discard the linked session 670, then determine the next highest ranking session 540, to link to said session its highest ranking facility 560, to check for conflicts in all of the available time blocks with this facility, and so on, to determine if any of these options will produce a scenario which produces no conflict, before proceeding to schedule a linked session, facility and time block with the least conflict number of the options considered.

In some embodiments if a conflict is identified at step 590 between a tentatively scheduled concurrent session and a previously scheduled session-facility pairing, then the tentatively scheduled facility previously identified at step 560, for which a conflict has been identified at 590, is checked against other time slots in different time rows. If there is a time slot for which there is no conflict the tentatively linked session and facility are scheduled in that time slot (not shown). However, if there are no time slots where there is no conflict, the system identifies if there are any other facilities free to be scheduled 640. If there are, the tentatively selected facility is discarded 650 and the next highest ranking facility is chosen at 560. If there are no conflicts at step 590 then the session is scheduled 600 for that facility.

In some embodiments, for example as described in FIG. 5, if there are no other facilities available for that time slot in the schedule, then the system determines if there are any sessions remaining for that time slot that need to be scheduled 660. If there are sessions remaining, then the session previously selected at step 540 is discarded 670 and the next highest ranking session remaining 540 is selected. If there are no more sessions remaining at step 660, then the highest ranking session with the lowest conflict is selected 680 and then scheduled 600.

The best to best method is preferred in applications where there is one attendee per session, for example with real estate, airlines and most healthcare situations, or when there are a much greater number of sessions than a single attendee will ever be able to attend at a particular time, for example in a university setting. In these cases, if conflicts arise, it is likely that any attendee with a conflict will have many more sessions they also wanted to attend that are concurrent to their own conflict. This fact in combination with the fact that the best to best schedule has scheduled the most important overall session to the second most important overall session (in consideration of conflicts), etc., the overall sessions that are most important to the overall schedules are always given the best spaces and times.

With respect to the best to the best of the worst of the best method, after the highest ranking session overall is selected and scheduled the concurrent session(s) are scheduled. To do this, a subset of all of the attendees forecasted to attend the highest ranking session is determined and then, within this subset, the lowest ranked session(s) is determined. The utility ranking for the identified low ranking group of session(s) is determined and then the session with the highest overall rank in this subset group is selected (hence best of the worst of best), and scheduled concurrently to the first scheduled session.

The best to the best of the worst of the best method is generally preferred when there are a small number of sessions scheduled at a particular time and when an attendee does not have many choices for sessions during a particular time row.

It is anticipated that in some instances the forecasted attendance for a high ranking session may be over the capacity of the largest available facility. In that case, in order to improve overall satisfaction the concurrent session should not be the best of the worst of the best. Therefore, in some embodiments an overcapacity modification may be applied to the best to best of worst best method. In the overcapacity modification the high ranking overcapacity session can be scheduled in the largest facility (even though it is anticipated that not all attendees who expressed a high degree of interest will be able to attend the highest ranking session). The facility capacity number is subtracted from the forecasted attendance number, which results in a target number, also referred to herein as the forecasted over attendance. The concurrent session could be any session that at least the target number of attendees (out of the subset of attendees who expressed interest in attending the overcapacity session) ranked as wanting to attend. In some embodiments more than one session may be forecasted to pull in at least the target number of people. In those embodiments the session with the highest overall ranking would be scheduled as the concurrent session. In some embodiments there may be multiple concurrent time slots available to pull in as close to the target number when combined. In some embodiments there may be multiple concurrent time slots available to pull in at least the target number when combined.

Figure 6:
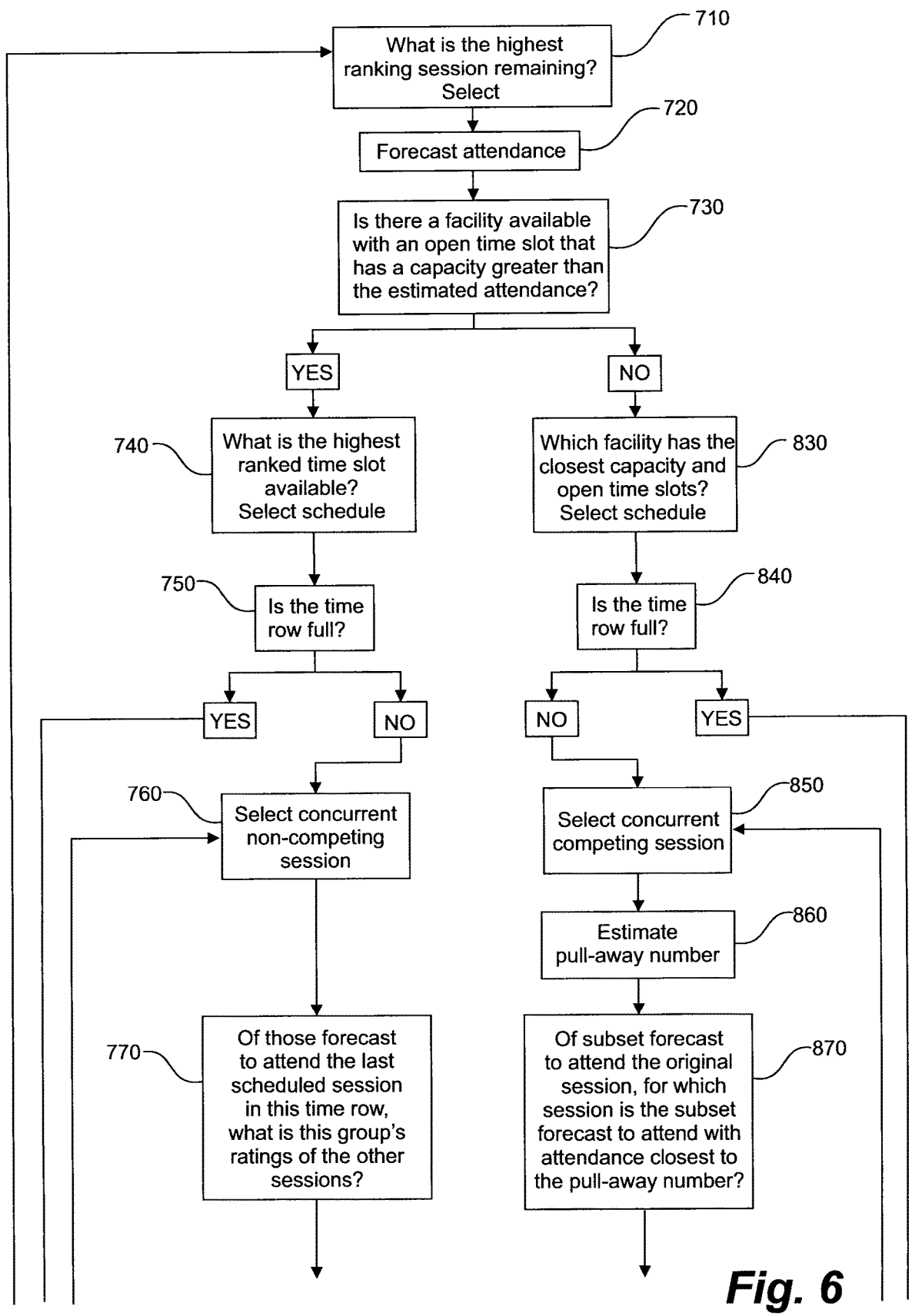
FIG. 6 is a diagram showing an embodiment of generating an event schedule where one session has a forecasted attendance which exceeds the attendance capacity of the largest facility.
Figure 6:
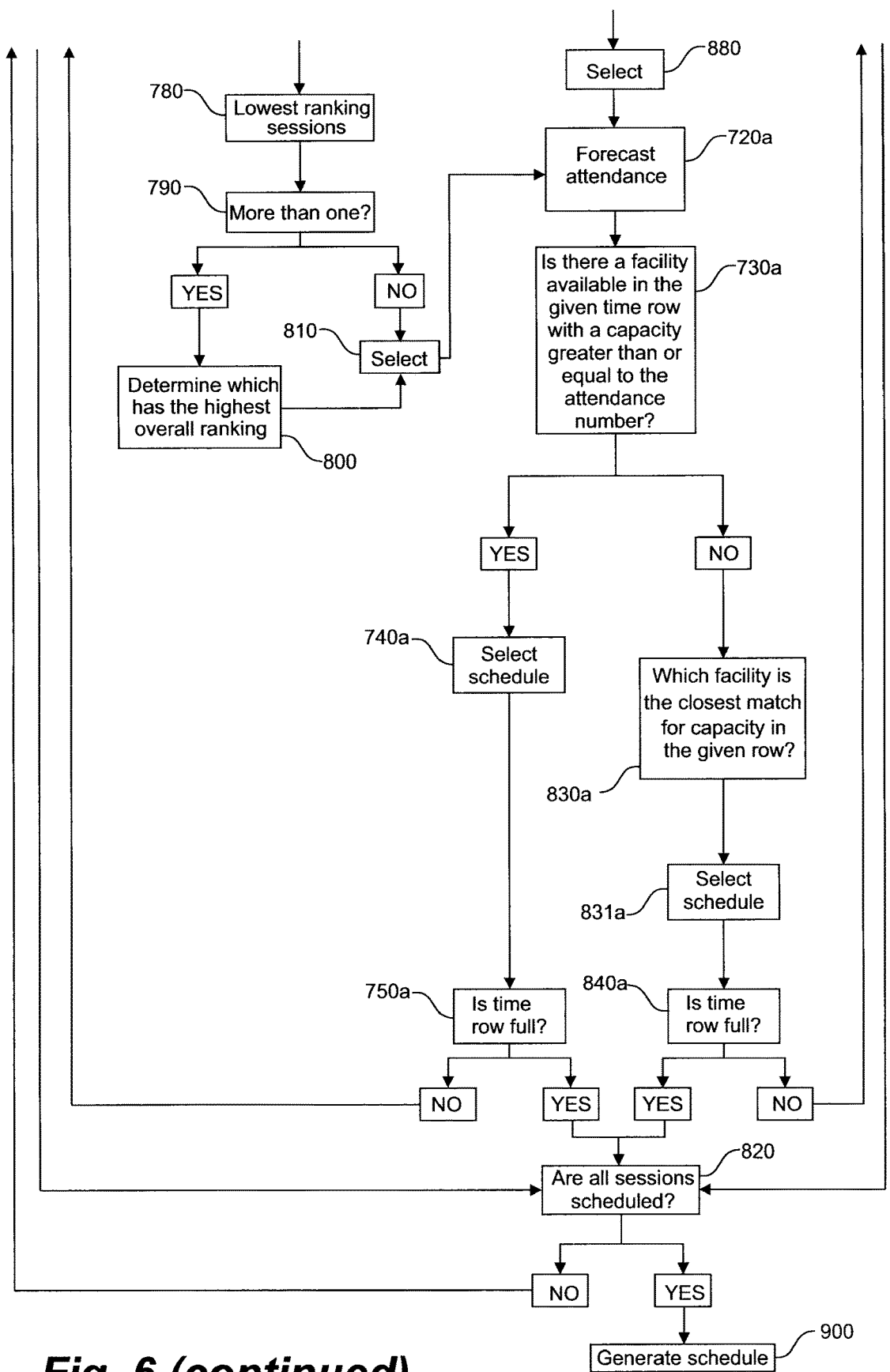

An example of the overcapacity modification is provided in FIG. 6. With the highest remaining session selected 710, attendance at that session is forecasted 720, either estimated or extrapolated, as described below with respect to FIG. 7.

At step 730 it is determined if there is a facility with a time slot available that has a capacity greater than the attendance identified in 720. If there is, the highest ranked time slot available is determined and the session is scheduled in that facility 740. At step 750 it is determined if the time row is full. If it is, then the method moves to step 820 to determine if all the sessions have been scheduled. In not, the process returns to step 710. If the time row is not full, a concurrent non-competing session needs to be selected 760 using the best to the best of the worst best method.

At step 770 the system considers how the attendees forecasted to attend the session previously scheduled at step 740 ranked the remaining unscheduled session(s) and determines which session(s) in that subset has the lowest ranking 780. If there is more than one lowest ranking session in the subset 790, the system determines which one has the highest utility ranking 800. That session is selected 810. If there is not more than one session identified at step 790, then the lowest ranking session is selected 810. Steps 720, 730, 740 and 750 are then repeated, and labeled 720a, 730a, 740a and 750a for ease of reference. If the time row at 750a is not full, the process proceeds back to step 760. If the time row at 750a is full, the system determines if all sessions are scheduled 820. If all sessions are scheduled 820, the schedule is generated 900 and can be sent to all attendees and other parties as previously described. If all sessions are not scheduled 820, then the process returns back to step 710.

If there is no facility available with an open time slot that has a capacity greater than the estimates attendance at step 730, then the facility with the closest capacity and open time slot is selected 830. If the time row is then full 840 the process moved to step 820 to determine if all sessions have been scheduled. If not, the method returns to step 710. If the time row is not full then a concurrent competing session needs to be selected 850. The number of attendees estimated or extrapolated in 720 minus the facility capacity, determines the estimated pull away number 860. At step 870 the number of attendees forecast to attend a different session which is closest to the pull away number is determined and then selected at step 880. The attendance at the selected session is forecasted 720*a* as previously described. If there is no facility available in a time row with a capacity greater than or equal to the attendance number 730*a*, then the facility that has the closest match with respect to capacity in a given row is determined 830*a* and selected 831*a*. As has been previously described, whether or not the row is then full is determined 840*a*. If it is, and all sessions have been scheduled 820 then the schedule is generated 900 and can be sent to attendees and other parties as previously described. If not all the sessions have been scheduled, the method returns to step 710.

In some embodiments the ranker and the attendee can be the same person and in some embodiments the ranker and attendee can be different people. In some embodiments an attendee may not provide a ranking. It is also anticipated that a ranker may change their minds about the session they would prefer to attend or attend an alternate session for social or other reasons. Therefore, it is anticipated that in certain instances there will not be an exact correlation between the session a ranker indicated they would attend based on their ranking and attendance at that session.

Figure 7B:
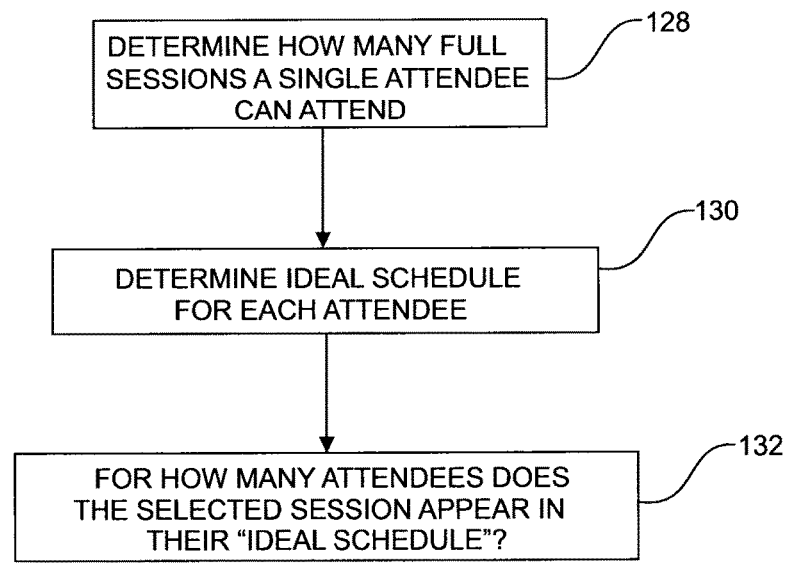
FIGS. 7A and 7B shows two methods for forecasting attendance at a session.
Figure 7A:
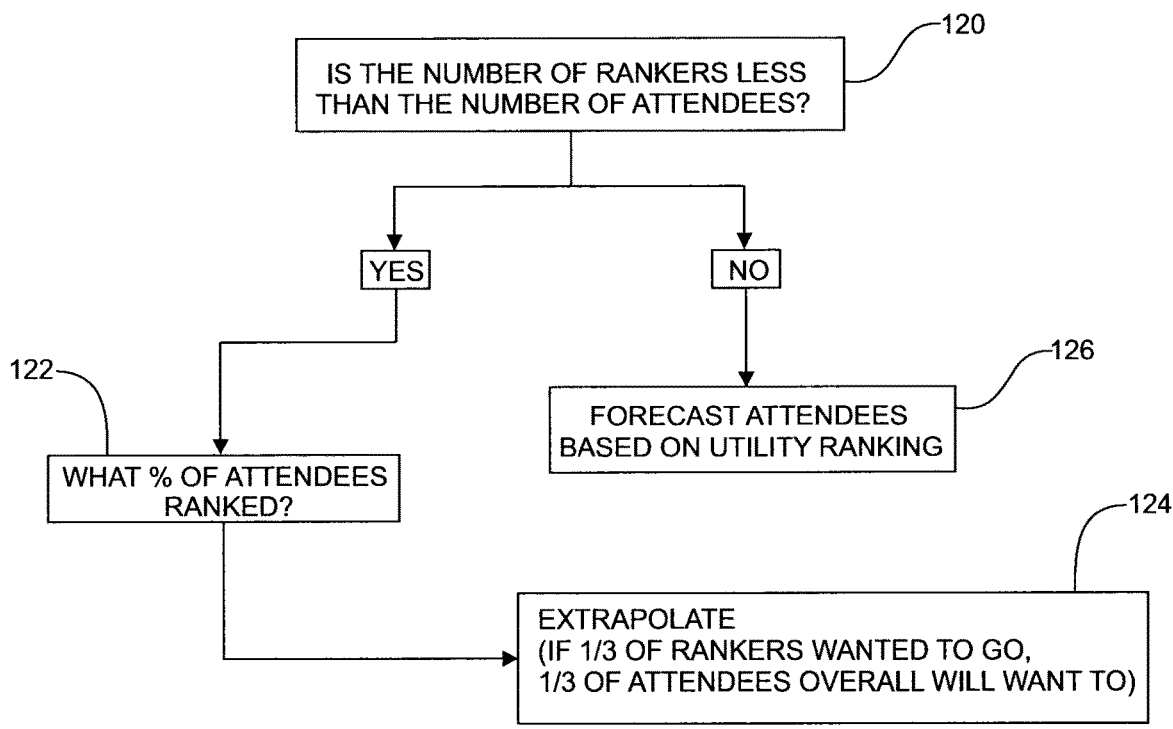

In some embodiments the method may include a further step of extrapolating attendance at a session, an example of which is shown in FIG. 7*a*. The extrapolation of attendance may occur where the comparison of the number of rankers and the number of attendees 120 is different. In some embodiments the organizer may set the percentage difference that may be required before the forecasted attendance would be extrapolated.

In particular where at least 10% of attendees have provided ranking information, it is favourable to consider the rankings as a polling and determine, by extrapolation, what percentage of attendees are also rankers 122. Knowing this percentage the system would then assume that the percentages would remain constant and extrapolate to the total number of attendees 124. For example, if 1000 people attend the event where there were one hundred rankers and thirty people ranked Session A as in their ideal session, the extrapolated attendance at Session A would be 30% of all attendees (or 300).

Where the number of rankers is not less than the number of attendees then the system will assume that, when given a choice, the rankers will choose to attend the session they ranked more highly in each time slot 126.

In some embodiments the attendance at a session can be estimated as shown in FIG. 7*b*. In order to estimate attendance the system will determine how may time slots there are available during the event that a single attendee can attend 128. In some embodiments the number of time slots is specified. In some embodiments the number of time slots is unspecified. Where the number of time slots is unspecified it may be assumed that the maximum number of sessions an attendee can attend is equal to the maximum number of chronological time slots scheduled at the event. Then the system determines the theoretical ideal schedule for each attendee 130. Once each attendee's theoretical ideal schedule is determined, the system then counts how many times a session appears in the theoretical ideal schedules of all of the attendees 132. This then provides an estimated attendance for each session.

As used herein, the forecasted attendance or attendees can refer to the estimated attendance or attendee or the extrapolated attendance or attendees.

In some embodiments no pre-event schedule is prepared prior to receiving the attendee selection feedback, whereas in other embodiments a tentative pre-event schedule is prepared.

In some embodiments organizers can receive post-session feedback regarding a session from attendees and/or rankers. For example, post-session feedback could include feedback of the topic presented, the presenter (or instructor or other similar person), the experience of the session, the satisfaction of the attendee after attending the session or any other comments that may be useful for organizers.

In some embodiments the event organizer can create a database that includes any combination of, or all of, the information that was collected in relation to the event including session and/or presenter selection information, session and/or presenter feedback information, attendance information, post-session feedback and any other feedback or information which was gathered or collected before, during or after the event which relates to the event or the speakers (or instructors or other similar person) at the event or which is collected through the practicing of the methods disclosed herein. This "event information" can be stored in the database of a computer system.

The event organizer, or other parties, can select event information that is relevant to them in relation to developing an event and then use the selected event information stored in the database to develop other events. For example, if an event organizer wanted to develop an event that addressed a subtopic of a previous or first event, the event organizer could review event information in relation to that subtopic and see if there were any common themes or areas of interest within that subtopic or outside that subtopic that attendees were also interested in and create an event that would be specifically geared towards the interests of that subgroup of attendees. As another example, an event organizer may review the event information and identify a particular type of session was popular or unpopular or received a large amount of positive or negative feedback and then the event organizer may structure the next event to maximize the types of sessions that were well liked. Similarly, event information can be used to select topics that may be trending or speakers that received more positive post-session feedback. An event organizer could consider any or all of these elements or other elements of interest in reviewing the event information and developing another event.

In some embodiments the event information can be used as the basis for a membership program. In other embodiments the event information can be used to improve the analysis of information collected at an event in order to continue to improve satisfaction of all parties involved in such events.

In some embodiments the "event information" can include event information from multiple events which is compiled and stored in a database for use in creating a future event.

Figure 8:
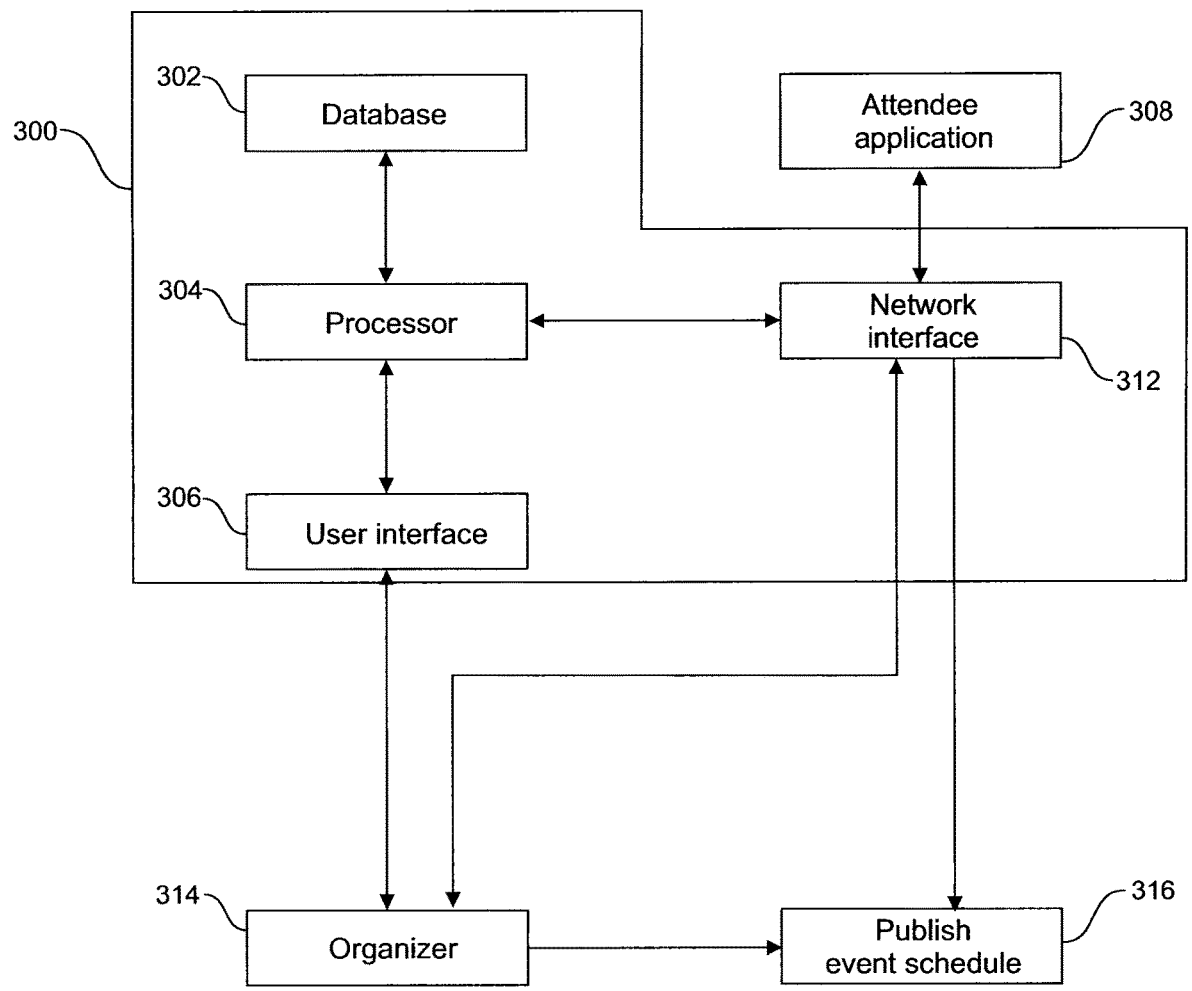
FIG. 8 is a diagram of a computer system used to perform a method of organizing an event.

With reference to FIG. 8, a system is provided which can be used to perform a method of organizing an event as disclosed herein. The system 300 can include a database 302, at least one processor 304, a user interface 306 and a network interface 312. The database 302 receives and stores information which is processed by the processor 304. For example, the database 302 can receive and store event information (or factors), such as facility information, session and/or presenter selection feedback, session and/or speaker feedback information, post-session feedback information, ranker information, session information, attendee information, information regarding other factors which can be considered to generate an event schedule, the event schedule and/or any other information relating to the event and the event schedule that may be used in future analysis. Information can be received by the system 300 wirelessly from the event organizer 314 or attendee application 308 via the network interface, or from the event organizer 314 through the user interface 306.

The database 302 is coupled to at least one processor and includes instructions stored therein which, when executed by the at least one processor, causes the processor to generate an event schedule based on the event information wherein the event information is at least the session and/or presenter selection feedback and the facility information.

The user interface 306 can be used by the event organizer 314 (via a user input device, for example a mouse, keyboard or touch-screen, and a display coupled to the system 300) to input event information to be stored in the database 302. The user interface 306 and/or network interface 312 can also be used to select, add, remove, amend or otherwise modify the factors (event information) considered when generating an event schedule.

The at least one processor 304 compiles at least the session and/or presenter selection feedback and facility information and performs the methods as described herein in order to generate an event schedule. Once the event schedule is generated, it can be sent electronically, which can be through a wired connection (not shown) or wirelessly via the network interface 312 to the event organizer 314 for approval, when required, or the event organizer 314 can approve the event schedule via the user interface 306.

In order to publish, or re-publish, the final event schedule the system 300 can send the event schedule electronically to at least one attendee or organizer. In some embodiments the event schedule can be sent to at least one attendee or organizer wirelessly via the network interface 312 to an application 308 accessible by attendees, organizers and/or other parties to which the event schedule is relevant, which can be accessed on a handheld electronic device or computer. In other embodiments the final event schedule can also, or alternatively, be published 316 by sending the generated event schedule to the event organizer 314 for posting at the event and/or on the event's website or forum, directly published 316 onto the event's website, forum or through any other means of communication with attendees used at the event via the network interface 312.

Non-limiting examples of how this method and system can be used in various industries are provided below.

Conferences

Figure 9:
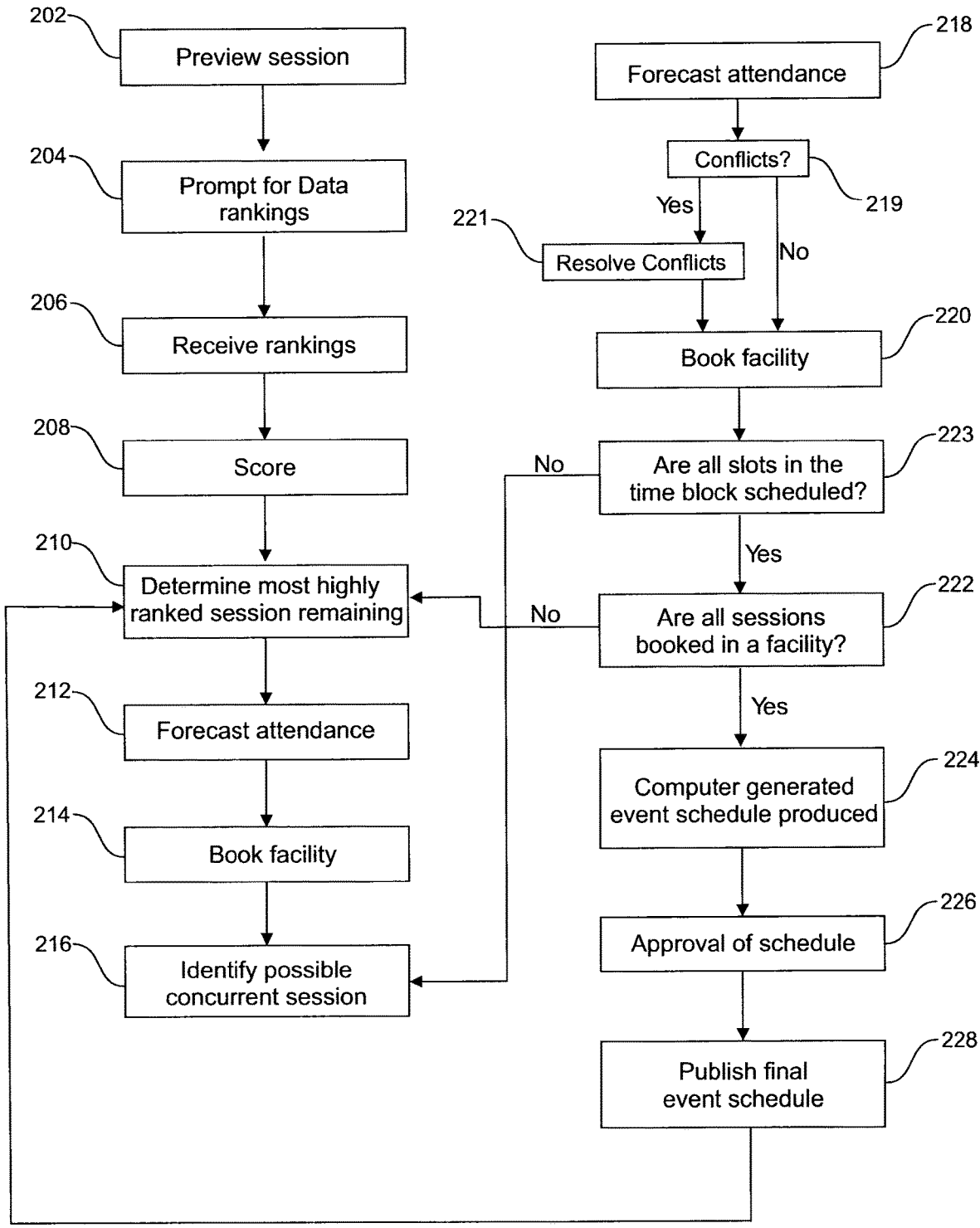
FIG. 9 is a diagram showing a simplified process for generating and updating an event schedule.

FIG. 9 provides an embodiment of the disclosed method which can be applied to conferences. Further, table 1, below, outlines examples of which parties can fulfil the roles described in the general method.

TABLE 1

| General Method | Conferences |
| --- | --- |
| Organizer | Organizers |
| Attendee | Attendees |
| Ranker | Attendees |
| Session | Sessions |
| Facility | Rooms |

Methods and systems for organizing events are provided herein. In some embodiments, organizers compile a list of rooms available at an event along with their specifications, expose event attendees to each session speaker, by way of a preview session, compile information from attendees regarding the sessions they plan to attend and produce a schedule based at least in part on the selection feedback provided by the attendees and the available rooms.

With reference to FIG. 1 in step 101 event organizers collect information on the rooms available, for example the size, design, electronic capabilities and attendee capacity in various layouts and store that information in electronic form. The event organizer can request rooms for the event from the host site based on the number of attendees registered or forecasted to attend.

In some embodiments the organizer can also identify the type of scheduling as a fixed schedule. In some embodiments the fixed schedule is the length of the conference or any other period of time that is appropriate in the circumstance.

Prior to the event sessions starting, attendees are exposed to the event speakers during a preview session. Generally speaking, a preview session is designed to provide attendees with short speeches on the key ideas the presenter plans to address in their session. This may occur, for example, by having each speaker attend an opening or preview session at the event and provide to the attendees a short summary of their topic or presentation in succession. In an alternative embodiment, a preview session may involve the attendees being exposed to the event speakers via access to videos prepared by each speaker prior to the start of the event, either by receiving access to such videos prior to arriving at the event or at the event itself. Alternatively, a preview session may include a combination of in person presentation(s) and video clip(s) available prior to the event.

With reference to an activity occurring "prior to the event", it is intended that this would include any time up to the start of the first session in the final event schedule, as defined below. For the purpose of this invention, a preview session organized or made available by the event organizer will be considered to occur prior to the event. In addition, there may be multiple preview sessions within one conference, and each grouping of preview sessions and resulting final event schedule, together are referred to as an "event". Therefore, where a conference, symposium, meeting or the like has multiple preview sessions and multiple final schedules, for example one for each day, then the conference, symposium, meeting or the like is said to include multiple events.

As used herein, the terms "speaker" or "presenter" are used interchangeably herein and are intended to refer to any person or persons who present at the event, lead or participate in a panel, or who otherwise run or are involved with presenting the material at a given session at the event. For example, a speaker or presenter may include a session chair, a host, a workshop facilitator, a coach, an activity guide, an activity co-ordinator, an entertainment co-ordinator, a performance artist, an interviewee, a journalist or other similar person.

In step 102, the event organizer electronically receives input from attendees as to which session(s) they would like to attend. Attendees may provide this selection information or selection feedback in any number of ways, including, at voting booths provided at the event, online through an event application or event website, by filling out a survey sent by the event organizer, or by any other electronic means, whether wired or wirelessly, that would inform the event organizer in a timely fashion which session(s) the attendee was interested in attending based at least in part on the preview session.

In some embodiments, attendees may also rate the presentations or sessions described by the preview sessions by order of preference or to indicate their level of interest in attending the full presentation or session. In some embodiments, attendees are required to provide selection feedback to the event organizer in order to receive credit for attending the event or for attending any particular session.

The selection feedback information is received by a computer, compiled in aggregate and then used to create a computer generated event schedule. In step 103 the event schedule is generated by computer, based at least in part on a best fit model considering attendee selection feedback and room availability. This provides the advantage of allowing the greatest number of attendees to attend the greatest number of sessions that are of the greatest interest to them, while taking into consideration the efficient use of booked event space.

In some embodiments other factors relevant to the schedule can also be considered, for example, any, or any combination of, the session ranking provided by the attendee(s), giving additional weight to the session selection of priority attendees, the speaker's schedule, general session topics, whether some sessions need to occur in a particular order, distance between rooms, allowing certain individuals to have simultaneous or overlapping session times or break times, accessibility of event attendees, or a subset thereof, to sponsored content or to demonstrations by sponsors or other groups. In some embodiments the ranking provided by the ranker may be modified 109. In the case of conferences, the modification may be related to the status of the attendee, where attendees with a VIP type status may have their rankings multiplied by a given factor.

In some embodiments the requirements rankings of the sessions can include strict requirements, for example that the facility must be set up in a workshop arrangement or must have a projector.

Once this information is provided, the individual utility ranking for each session is determined, with the highest utility ranking session being selected for scheduling. The highest ranking facility is identified which conforms to the parameters provided by the requirements rankings. For example, if a session requires a projector, only those facilities with a projector are considered.

Having identified the highest ranking appropriate facility, the session and facility are linked. The process then continues as previously described until all the sessions and facilities are scheduled.

In some embodiments the draft event schedule may be sent to the speakers for feedback prior to being finalized by the event organizer.

In some embodiments the method may include prompting or requesting attendees rate the speakers after the conclusion of their session. The event organizer may collect this speaker feedback by any known computer implemented method, for example as described above in relation to collecting attendee selection feedback. In some embodiments, where the speaker feedback response option is available (or "turned on"), the event organizer may use this speaker feedback to determine the payment amount the speaker will receive. In some embodiments, where the speaker feedback response option is not available (or "turned off"), the event organizer may pay speakers a flat fee or a specific fee as negotiated by the speaker.

In some embodiments, attendees are required to provide speaker feedback to the event organizer in order to receive credit, or additional credit, for attending the session.

One possible advantage of having the speaker feedback response option turned on is that it may incentivize speakers to self-select to participate in events and to tailor their message and delivery such that they will more deeply connect with attendees and thereby increase attendee satisfaction and engagement.

In further embodiments, the attendee selection feedback and/or speaker feedback may be used to develop a database which compiles information from various events. In some embodiments the aggregate information may be utilized, for example, to realize additional features and advantages including but not limited to forecasting a presenter's probability of running late and incorporating this information when producing an event schedule; assembling and producing as outputs lists of groups with shared interests and views as determined by ratings and attendance data; advertising upcoming events, sessions, products or services to the individual or group targeted for advertising; to book events 'from scratch', for instance, recommending locations, content and speakers based upon identified audience groups and data indicating their receptivity and satisfaction to these and other factors; to schedule staggered breaks in a schedule to encourage like-minded individuals, as determined by the data, to meet; and using the information gathered to allocate other event resources, for instance flip charts, audio equipment, or video projectors at the event.

In some embodiments a membership program may be available to attendees, where the attendee may be able to earn or acquire various perks and may award certain attendees with "priority attendee" status. For example, those attendees who give regular and detailed feedback and/or who use the system regularly and/or who attend events which use the system regularly may have an account which grants them priority registration access to events deemed relevant to their interests, give their ratings a higher priority during the computer generating of the schedule, rank their interests and location more highly when composing or suggesting events 'from scratch', granting direct contact with speakers through physical or electronic means, access to early registration and/or reduced registration rates and any combination thereof.

In some embodiments additional perks that may be available to attendees who provide speaker feedback information can include allowing those attendees to access additional content related to or provided by the speaker that the attendee provided feedback on.

In some embodiments attendees may be able to digitally ask a speaker questions and have the speaker answer those questions directly or in a digital forum. Questions submitted prior to a session may help the speaker to guide attendees during guided sessions, for instance, a workshop. Having a database of questions may further help speakers to tailor subsequent sessions. Forums created for and maintained after events may further help to incentivise speakers to connect to their audiences, and offer an incentive for speakers to participate in the system as it will offer them exposure. Generating such communities may also further help audiences, organizers and speakers in the creation of 'from scratch' events, as community subsets will be identified and accessible for proposals and prototyping of ideas.

Example 1

By way of example, the method can include a conference having 100 attendees and a total of four sessions (A, B, C and D), split into two rooms in two time slots. In this example, the first room (facility) has a capacity of 90 people and the second room (facility) has a capacity of 30 people.

The 100 attendees each attend a preview session 202 prior to the conference which previews sessions A, B, C and D.

The attendees are prompted to rate the session 204 in order of preference, with "1" being the session they liked best and "4" being the session they liked least. The responses are received 206 and for this example are shown in Table 2.

TABLE 2

|  | 60 people ranked: | 20 people ranked: | 15 people ranked: | 5 people ranked: |
| --- | --- | --- | --- | --- |
| Session A | 3 | 3 | 2 | 2 |
| Session B | 2 | 4 | 1 | 3 |
| Session C | 1 | 2 | 3 | 4 |
| Session D | 4 | 1 | 4 | 1 |

Based on the attendees' response the session having the most interested attendees is determined and will be the anchor in the event schedule, since that session being accessible by the most attendees is more likely to result in increased conference satisfaction.

The ranking of each session is determined by first calculating their overall score 208. This can be done for each session by multiplying the number of people who gave that particular session a ranking of 1, 2, 3 or 4 by the rank value and then adding together all of those numbers. For example, the overall score for the presenter for session A may be calculated as follows:

$$(60 \times 3)+(20 \times 3)+(15 \times 2)+(5 \times 2)=280.$$

Therefore, in this case, the sessions are scored as follows: Session A—280; Session B—230; Session C—165; and Session D—325. From this information the sessions can be ranked with the most highly ranked session being identified 210. Since "1" was the highest rank, the lowest score can be the highest ranked session. It is contemplated that modifications can be made to these rankings and other factors can be considered in determining the utility ranking, however in this example the ranking is equivalent to the utility ranking.

Since there are four presenters and two sessions running simultaneously in the schedule, one conference attendee present for the entire conference can attend at maximum two full sessions. This means that whichever two sessions an individual attendee rated most highly are the ones the attendee implied they would see, if they had an ideal schedule.

Using this information, the number of attendees who are planning on attending session C can be forecasted 212 by adding together the number of attendees who ranked it in the top half of their ranking (in this case either a 1 or a 2). Referencing the information in Table 2, we determine this number is 80 people.

In order to book a facility 214 for session C, the projected number of attendees may then be compared with the room size information. We see that session C should be assigned to the first room (the larger facility). Session C is now tentatively put forth in the schedule as the first session to occur in the first facility.

Since the conference is scheduled to have concurrent sessions, this example uses the best to the best of the worst of the best method.

During time block 1, session C will run concurrently with a second session, which needs to be tentatively identified 216. Since session C will run in the larger of the two rooms, this concurrent session must be able to fit in the second room (the smaller room). Furthermore, anyone who wished to attend session C ideally should be able to. Therefore, the session scheduled concurrent to session C should be a session which was ranked highly by people who did not rank session C highly.

An additional consideration is that those who attend session C get to attend their other favourite session.

Therefore, the people who ranked C as a 1 or a 2 are identified to see what they ranked as 3 or 4. It is desirable to maximize the number of attendees to be able to attend their top two rankings. From Table 2 it is seen that session B is ranked 2 by 60 people and that session D is ranked 1 by 20 people. It is also evident that A is ranked '3' by all these 80 people in the subset (those who ranked presenter C as "1" or "2").

Therefore, session A then is the best to schedule concurrently with session C. To forecast the attendance 218 for session A, the number of people who ranked it as either a "1" or a "2" is determined. Table 2 shows that 20 people ranked it as a "2" and no one ranked it as a "1", therefore an attendance number of 20 people is forecasted. It is then determined whether or not there are any conflicts 119 resulting from the tentative pairing. If there are no conflicts the identified session can be scheduled concurrent to session C but in the second room 220. If there is a conflict the conflict can be resolved 221 as previously discussed before booking a facility 220.

The question is then asked if all of the time slots in the row are scheduled 223. In not, then the process returns to step 216. If all of the slots in the row are scheduled it is determined if all the sessions are scheduled 222. In this case the answer is "no" and so the next step is to determine the most highly ranked session remaining 210 and repeat the subsequent steps. In this case the steps are repeated with the remaining sessions—B and D—for the second time block. Of the two remaining options, session B is the most highly ranked, so we determine its attendance forecast and slot it into a room, in this case the first room. This means session D will run concurrently and from Table 2 its forecast attendance allows it to fit into the second room.

As all of the sessions have now been linked to a facility a computer generated event schedule is produced 224 and in this case is shown in Table 3. This event schedule can be sent out to the event organizer for approval 226, if required. Once approved, if necessary, the final event schedule can be published 228 and can be sent wirelessly to attendees.

TABLE 3

|  | Room 1 | Room 2 |
| --- | --- | --- |
| Time Block 1 | C | A |
| Time Block 2 | B | D |

Even from this simplistic example of only four sessions, the advantages can be identified. The information compiled in Table 2 shows that 60 people most wished to attend sessions C and B; 20 people most wished to attend sessions D and C; 15 people most wished to attend sessions B and A; and 5 people most wished to attend sessions D and A.

In some embodiments it is anticipated that there could be changes to the schedule resulting from information being added, updated or modified. In the event information in the system is added or changed the schedule can be amended by returning to step 202 or 210.

Of the 100 conference attendees, the example embodiment of the process has adopted the time and space requirements such that all of the attendees participated in their ideal conference, without conflict to space or time and with a more efficient utilization of space than possible at a traditionally organized event.

While in more complex scenarios all attendees being able to attend their ideal event may not be possible, using this method a larger percentage of attendees will be able to attend their preferred event. In more complex situations additional factors may also be considered along with, or alternatively to, the least favourable ranking score from the already-scheduled subset. The overall goals of the event organizer will direct what factors will be given what weight to the overall schedule generation calculation.

Healthcare

In one embodiment the disclosed method can be applied to the healthcare setting. Table 4, below, outlines examples of which parties can fulfill the roles described in the general method.

TABLE 4

| General Method | Healthcare |
|---|---|
| Organizer | Administrators |
| Attendee | Patients |
| Ranker | Triage Staff |
| Session | Treatments |
| Facility | Hospital Rooms (e.g. Operating room, treatment room, recovery room etc.) |

At step 101 facility information entered by the organizer can include the capacity and type of facility available. In some embodiments the organizer can also set a buffer constant. In some embodiments the buffer constant can be about 1 hour, 5 hours, 10 hours, 24 hours, 48 hours or any number of minutes or hours between those examples that would be appropriate in the circumstance.

The "preview session" in the healthcare setting is a diagnostic triage preview session which can be run either by an automated process and/or a triage check in session conducted by a healthcare professional or professionals (the ranker in this case). The ranker ranks available treatments based on diagnostic observations and/or triage sessions and/or health data of the patient.

In some embodiments the ranking information can be modified, for example in some embodiments patients in need of care more urgently can have their rankings multiplied by a given urgency factor or if a patient has been waiting an extended period of time their ranking may be multiplied by a factor to place them ahead of other patients who have a similar level of urgency. For example, requests can have their ranking multiplied after specific periods of time in order to maintain a queue of the waiting patients when they are all of similar urgency. In some embodiments the ranking can be multiplied every hour.

In some embodiments the requirements rankings of the sessions in the healthcare industry can include strict requirements, like needing the facility to be an operating room to perform an operation treatment (the "session"), or a preference, like having certain treatments in a facility further away from an area with people who are contagious.

Once this information is provided, the individual ranking for each session is determined, with the highest utility ranking session being selected for scheduling. The highest ranking facility is identified which conforms to the parameters provided by the requirements rankings. For example, if a session (in this case a treatment) comprises a surgery which must occur in an operating room, then only those facilities which are operating rooms are considered as a possible facility. Having identified the highest ranking appropriate facility, the session and facility are linked. The process then continues as previously described until all the sessions and facilities are linked or scheduled. Once the schedule is complete for a particular time period, that schedule can then be sent to the attendees and the staff and/or the manager of the facility in order to prepare the facility for the sessions.

Example-2

In this non-limiting example, a hospital or healthcare center (the event) offers four types of treatments (each individual treatment for a patient is considered a different session), which can be, for example, Dialysis (A), a Pharmacology Consult (B), a Surgery (C) and Recovery (D). The center has two kinds of rooms (facilities), an Operating Room (OR) and a Standard Room (SR). Strict requirements include that treatments A and C must occur in an Operating Room (OR), while B and D can occur in any Standard Room (SR). The center has 2 Operating Rooms and 2 Standard Rooms, apart from a separate Triage Centre. All Treatments, whether A, B C or D take 1 hour to complete.

Considering the length of the treatments and any additional time needed for moving patients between rooms, among other factors, in this example the center can operate 10 treatments per room per day, and therefore there are a maximum of 40 time slots to fill in the schedule each day. Since two of the rooms are Standard Rooms, and two of the rooms are Operating Rooms, a total of 20 instances of A and C, and a total of 20 instances of B and D, can occur daily. However the exact number of each treatment each day can fluctuate. For example, on one day there could be 18 patients receiving treatment A and 2 patients receiving treatment C. On another day, there could be 10 patients receiving treatment A and 10 patients receiving treatment C.

In this example there are a total of 80 people needing treatment from the hospital (patients). Some have been taken in at the hospital, and others have been referred from elsewhere. Each patient has had an initial triage preview, whereby a triage doctor or nurse has indexed the patient's condition and evaluated what treatment they needed, and with what urgency.

During this triage preview, the triage doctor or nurse (ranker) enters information about the patient's needs, which in some embodiments may be a rating of their needs which reflects both the treatment(s) the patient should receive and the urgency of the treatment(s). For example, where a patient is determined to need dialysis and no other treatment the ranker would enter their ratings for the dialysis treatment (A) as "yes".

In some embodiments if a treatment is needed, the ranker is prompted to enter an urgency rating, an example of a modification factor, for the treatment. In some embodiments urgency ratings may be on a scale of 1 to 3 with 1 meaning "not urgent", 2 meaning "moderately urgent", and 3 meaning "critically urgent".

The "yes" is assigned a value of 1 and multiplied by the modification factor. In the case where the patient does not need any other treatment, a rating of 0 ("no") is assumed in relation to all other treatments. When a ranker ranks a treatment in relation to a given patient above a zero, in this example, this generates a session of the given treatment having the given patient as the attendee. Therefore, patient 1 has requested one session of treatment A which has a utility ranking of 2, which is determined as follows:

TABLE 5

| Treatment | Yes/No (Y = 1, N = 0) | Urgency | Total |
|---|---|---|---|
| A | 1 | 2 | 2 |
| B | 0 | 0 | 0 |
| C | 0 | 0 | 0 |
| D | 0 | 0 | 0 |

In this example, patient 2 also only needs Dialysis (A), but more urgently. In addition, the triage doctor and/or nurse also determines that he needs a pharmacology consult (B), however the consult is less urgently needed than the Dialysis (A). In this example patient 2 has requested two sessions, the first being one consisting of treatment A and having a utility ranking of 3, and the second consisting of treatment B and having a utility ranking of 2, which is determined as follows:

TABLE 6

| Treatment | Yes/No (Y = 1, N = 0) | Urgency | Total |
|---|---|---|---|
| A | 1 | 3 | 3 |
| B | 1 | 2 | 2 |
| C | 0 | 0 | 0 |
| D | 0 | 0 | 0 |

Further ranking data is received for the remaining patients needing treatment in the manner described above. In this example each individual treatment for a patient is considered its own session.

In some embodiments the most ideal slot on any given day is the earliest treatment scheduled in the operating room. The first time slot of the operating room facility is identified as the highest ranking time slot in the highest ranking facility. In some embodiments the later the time slot the lower it is ranked. In some embodiments facilities other than the operating room are also assigned a lower rank than the operating room.

In the healthcare situation, typically there is one attendee per session (treatment), for example only one person will be operated on, although it is possible to have multiple attendees for example when dealing with a physical therapy class. Therefore in some embodiments the session rankings are directly related to the attendee (patient) rankings for a particular treatment, whereas in other embodiments the session ranking is an aggregate of attendee rankings. In this example, there is only one attendee per session for each of the identified sessions.

In one embodiment the database of session (treatment) rankings is searched by the computer, and is filtered down to sessions with the highest rankings, in this case treatments A and C (having a rating above zero in either). Then, the session with the highest utility ranking in either A or C is identified. The patient associated with the selected session is scheduled into operating room 1 for the first time block of the day. If this patient has their highest rating associated with treatment C, they will need a recovery room D directly after being in the operating room. Therefore as a requirement of the process that patient is then scheduled into a recovery room in the time slot directly after they are scheduled to be in the operating room.

The process is repeated, scheduling the next highest-ranking treatment in terms of A or C in Operating Room number 2.

In some embodiments the most important facility type is fully scheduled before beginning to schedule other facility types, with the exception of any facilities required to be scheduled after scheduling the most important facility. In this example the above process is repeated, scheduling the next highest-ranking patient in terms of A or C in Operating Room number 2 and then continues to be repeated until each operating room is full for the duration of the current schedule.

In this example, after both operating rooms are scheduled the standard rooms may be scheduled.

In this example the standard rooms can be used for both recovery (D) and a pharmacology consult (B). In the sequencing requirement, recovery (D) was pre-defined as having to take place after surgery (C). Since in the first time slot of the day no surgeries have occurred, the only treatment which can be slotted into the standard rooms in the earliest time slot is the pharmacology consult (B).

Excluding the sessions which have already been scheduled, the session having the highest ranking regarding the pharmacology consult is scheduled in the first standard room. The process is repeated with the session with the next highest ranking for a pharmacology consult being scheduled in the first time slot in the second standard room.

In some embodiments the session scheduled in the operating room facilities in the first time slot both require that the standard room facilities be booked for those patients in the second time slot. For example, if both of the treatments scheduled into both operating rooms on the first time block of a day are surgeries, both of the treatments scheduled in the second time block in both of the standard rooms will be Recovery (D). In this case, the next time block to be assigned in the standard rooms will be the next available, which may be the third time block or later. Once all of the rooms and time blocks are scheduled with treatment sessions the schedule can be sent directly to the patients, the managers of the facilities and anyone else who may have a need to know the schedule (for example the doctors attending to the patients).

The schedule may be produced in consideration of a buffer constant, meaning that no changes will be made to the schedule based on new or modified information prior to a certain amount of time elapsing from the time the new or modified information is added.

In some embodiments the final schedule may also be modified by ongoing real time data such that the schedule would be continually recalculated in accordance with the most recent available data. In some embodiments a time block would not be available to be rescheduled once that time block starts in real time. For example, if a patient in urgent need of dialysis is rushed to the hospital, their dialysis session having a higher ranking than that of any patient present in the system, as soon as this information is received, the schedule is re-run in the manner previously described, beginning from the earliest time block which has not yet started in real time. This means that the patient is automatically scheduled-in for the soonest possible treatment, in consideration of the urgency of other treatments, that the schedule is changed, and that all doctors, practitioners, patients and other similar persons are notified of the schedule change from a unified system.

In some embodiments there may also be a buffer constant set into the system whereby patients cannot be rescheduled within a specific time period after the time the information about the new patient is added to the system. For example, if a facility manager needs one hour to prepare the facility for the next session, the schedule cannot be amended for time blocks within one hour of the time the new patient information is added to the system. It is anticipated that the buffer constant may be different for different types of treatments (sessions).

The schedule generated using this method places patients with the most urgent care at the front of the line for treatment and more equitably and efficiently uses the available space in light of the care needed by each patient.

Real Estate

In one embodiment the disclosed method can be applied to the real estate industry. Table 7, below, outlines examples of which parties can fulfil the roles described in the general method.

TABLE 7

| General Method | Real Estate |
|---|---|
| Organizer | Administrators |
| Attendee | Tenants |
| Ranker | Tenants |
| Session | Leases |
| Facility | Units |

At step 101 facility information entered by the organizer can include the square footage of various facilities available for lease, zoning (for example retail space, office use, restaurant use, etc.) as well as scale rankings with respect to more subjective characteristics like the modernity of the facility and any recent renovations, with a higher ranking given to recent renovations or upgrades.

In some embodiments the organizer can also set a buffer constant. In some embodiments the buffer constant can be about a month to give, for instance, the lessee time to move in, or any amount of time that would be appropriate in the circumstance.

The "preview session" in the real estate setting is the prospective tenant (the "ranker") previewing the types of facilities available for lease (the "session"). The types of facilities available may include commercial space, residential space, restaurant space, industrial space etc. In some embodiments the ranker selects the type of facility. In some embodiments the ranker ranks specific individual facilities. In some embodiments the ranker both selects the type of facility and ranks specific facilities identified.

In some embodiments the ranking information can be modified, for example in some embodiments tenants who request a zoning category with a higher lease rate per square footage (for example retail space is often more expensive than office space) may have their rankings multiplied by a given factor in an effort to maximize revenue by matching high value clients with the spaces they most prefer.

In some embodiments the requirements rankings of the sessions in the real estate industry can include strict requirements, like the lease session needing to occur in a facility which is zoned and equipped for a specific purpose, for example for a restaurant.

Once this information is provided, the individual ranking for each session is determined, with the highest utility ranking session being selected for scheduling. The highest ranking facility is identified which conforms to the parameters provided by the requirements rankings. For example, if a session (in this case a lease) can only be executed for a specific type of facility (for example one that is zoned and equipped for a restaurant) then only that specific type of facility is considered. In some embodiments, where an attendee (the prospective tenant) ranked certain characteristics of a facility as being preferred, for example the tenant prefers to lease space in a shopping mall rather than a plaza, all those facilities which are in shopping malls within the identified subset may be given a further multiplier or add-on to their ranking with respect to the particular session being considered.

Having identified the highest ranking appropriate facility, the session and facility are linked. The process then continues as previously described until all the sessions and facilities are linked.

Example-3

In some embodiments a company is looking to open a franchise store in a certain location. For example, the franchise store may be a fast food restaurant. The restaurant may have a set of requirements for the space they are going to lease, a set of parameters for the lease itself, for example the length of the lease, and other related requirements, for example distance from other similar businesses and/or type of complex in which they want to least space.

In some embodiments the lessor can lists space(s) (facilities) available for lease, including key information about the spaces. For example, a lessor may have a development complex with multiple floors having 'Space 1' which may be an office space of 1000 sq ft., 'Space 2' which may be a medical space on the second floor, 'Space 3' which may be retail space on the ground floor and 'Space 4' which may be roughed in for a restaurant on the ground floor. The lessor may also own another building, which has two office spaces 'Space 5' with 2000 sq. ft. and 'Space 6' with 1500 sq. ft. on the second floor, and two restaurant spaces 'Space 7' and 'Space 8' on the ground floor. In some embodiments the lessor may also be considered a ranker and provide ranking information regarding characteristics of their facilities, for example how modern the facility is.

In some embodiments the lessee (ranker) would rank the spaces on general favourability, for example a more modern facility may receive a higher rating.

The lessor may receive interest from multiple potential lessees. For example, Tenant 'A' may a fast-food burger chain, Tenant 'B' may be a dentist, Tenant 'C' may be a cosmetics store, Tenant 'D' may be an Asian food restaurant, Tenant 'E' may be another burger chain, Tenant 'F' may be a start up advertising company, Tenant 'G' may be a cigarette distributor and Tenant 'H' may be an established architectural firm.

The lessor provides the lessees with a computer interface which allows them to input information about the nature of their business and other facility related preferences. In some embodiments the lessor may modify the tenant's utility rating based on the estimated income from a tenant. For example, retail space is generally leased at a higher rate per square foot than office space. In consideration of this, the retail-type businesses' ratings may have a modifier which multiplies their selections to be worth more in the ranking, thereby allowing their lease to be scheduled first and at a higher priority than they otherwise would have had.

In this example, Tenant 'A' may enter into their interface that they are a consumer facing restaurant. From a selection of categories, they further select that they are 'American/Casual' dining specializing in 'Burgers'.

A utility ranking for each potential lessee is calculated based on the information and ranking the lessee provided, including any modifications by the lessor. An example may be:

Tenant Utility Ranking=(Requested Square Footage×Category Lease Rate)+(Brand Recognition Score)+(Length of Lease Requested).

In some embodiments lessees can input their own preferences related to the facility and the lease. For example, the lessee may be looking for a facility in a certain area. This information can be stored to modify the rankings of the available facilities with respect to the lessee's preferences.

In this example, Tenant 'B' enters their business is dentistry, and checks a box on the interface that allows them to indicate they desire to be in a professional setting.

Based on the information provided, including the ranking information provided by the potential lessee, a utility score is assigned to each lessee's lease session. Based on the information provided in this example, including the assumption that leasing the restaurant spaces pay the highest lease rate per square foot to the lessor, and are considered, in the lessor's system, the most important tenants and on other factors, such as brand recognition, we may find that Tenant 'A' has the highest utility rating.

The system therefore schedules this lessee first.

The facilities which meet the set facility type parameters are identified as a subset of all the available facilities. In this case, the parameters indicate that a restaurant facility is required.

In some embodiments the subset of facilities can be ranked based on the information provided by the lessee. In some embodiments an original ranking by a lessor with respect to a particular element of the facility can be modified to reflect the lessee's preferences. For example, Building 2 may only have been given a score of 1 (original ranking) by the lessor for modernity, but it may be closer to the neighbourhood the lessee indicated they would prefer. Therefore, this may give the facility's 1 ranking a +2 score, resulting in a modified ranking as a 3, in respect to that lessee.

Based on a ranking of various locations, we may find that Tenant 'A' desires most strongly to be in an appropriate facility in the second building. Space 8 most closely matches the preferences and rankings. Therefore, Tenant A's lease is tentatively scheduled in Space 8.

As previously described, the next lease to be scheduled may be a concurrent lease with the highest utility ranking placed in a space which does not generate a conflict. In some embodiments, the method may include a factor which ensures that retail or restaurant spaces in the same category are spaced as far apart as possible. For example, this factor would discount Tenant 'E' from the selection process for Space 7. Therefore, the remaining restaurant, Tenant D, is set to lease Space 7. With conflicts between lessees with respect to business type in closely located facilities avoided, the remaining restaurant (the second burger chain), the lease for Tenant 'E' is scheduled to Space 4.

The next highest ranking lessee, in accordance to the lessor with respect to the lease rate of retail leasing, in this example, is Tenant 'C'. This is assigned in the remaining retail space, Space 3. The next highest ranking tenant is the dental office, Tenant B, which is scheduled to the only medical space, Space 2. All the lessees and facilities remaining are the office lessees and facilities. The next highest ranking lessee we assume for this example is the cigarette distributor, Tenant G. It matches most ideally with Space 1. However, due to the nature of the business, it is in conflict with Tenant's B request of a professional setting. Having already scheduled the higher ranking Tenant B, Tenant G is moved to the closest matching office space in the second building, which is Space 5.

The remaining leases for specific lessees are scheduled in order of utility ranking, modifying the available subset of spaces based on their previous inputs of preferences. The resulting tentative leasing schedule is produced, and is sent to lessor for approval.

Potential advantages of the system are apparent in that it satisfies prospective lessee's requirements and preferences while scheduling leases in all available spaces and not wasting space because an important client is prematurely scheduled into a space which conflicts with the more important client's preferences or which serves to treat similarly important clients differently. Possible advantages of the system compound as the number of facilities and lessees are increased.

In some embodiments, the business category ranking may be as follows; restaurant assigned a value of: 4; retail assigned a value of 3; medical space assigned a value of 2 and office space assigned a value of 1 to reflect the lessor's preference of types of lessees relating to the general per square foot leasing rate in those lesses's industries or space type.

Offices

In one embodiment the disclosed method can be applied to offices. Table 8, below, outlines examples of which parties can fulfil the roles described in the general method.

TABLE 8

| General Method | Offices |
| --- | --- |
| Organizer | Management |
| Attendee | Attendees to a meeting or workers on a project |
| Ranker | Attendees to a meeting, workers on a project or managers |
| Session | Meetings or Work Periods |
| Facility | Offices, Meeting Rooms or Common Spaces |

At step 101 facility information entered by the organizer can include the capacity and layout of the various facilities available in the office or working environment, for example, meeting rooms or work rooms.

In some embodiments the organizer can also set a buffer constant. In some embodiments the buffer constant can be about a thirty minutes or any amount of time that would be appropriate in the circumstance.

The "preview session" in the office setting involves the ranker reviewing the types of facilities available for the meeting or work session. The types of facilities available may include a meeting room, board room, work space, studio or other work environment. In some embodiments various meetings and programs may be available for the ranker to rank. In some embodiments the ranker may select solo work time in a private space, which would generate a solo work time session with that attendee that made the request being the only forecasted attendee.

In some embodiments the ranking information can be modified, for example in some embodiments managers may have their rankings of sessions multiplied by a given factor over the rankings given by employees.

In some embodiments the requirements rankings of the sessions in the office application can include strict requirements, like a facility with a certain amount of seating available or a certain room capacity.

Once this information is provided, the ranking for each session is determined, with the highest utility ranking session being selected for scheduling. The highest ranking facility is identified which conforms to the parameters provided by the requirements rankings. For example, if a session has a requirements ranking that indicates that it needs to occur in a facility with a certain number of seats, only those facilities with at least that number of seats will be considered.

Having identified the highest ranking appropriate facility, the session and facility are linked and scheduled in a particular time slot. The process then continues as previously described until all the sessions and facilities are scheduled.

Example-4

In some embodiments, the general method is applied to an office, a group of offices or another co-working space. In this non-limiting example, the method can include an office or co-working space with 100 attendees, with a total of four sessions (A, B, C and D), to be split into two rooms in two time slots. Sessions correspond to solo work time, meetings, and other activities. The first room is a general workroom and has a capacity of 90 people and the second room is meeting room and has a capacity of 30 people. This information is stored on a computer in step 101.

The 100 attendees each see a preview session 202 which summarizes their work and tasks for the day and which previews sessions A, B, C and D. The attendees are prompted to rate the session 204 in order of preference, with "1" being the session they would like to work on today the most and "4" being the session they would like to work on today the least. Their managers may have a separate interface which allows them to add their own ranking which may multiply or modify the attendees rankings. For example, if a manager designates that a certain task is more important, this might be translated to a user's ranking of that session as a further −1 (with 1 being the most important), or a +1 (with 4 being the most important). The responses are received 206 and for this example are shown in Table 9.

TABLE 9

|  | 60 people ranked: | 20 people ranked: | 15 people ranked: | 5 people ranked: |
|---|---|---|---|---|
| Session A | 3 | 3 | 2 | 2 |
| Session B | 2 | 4 | 1 | 3 |
| Session C | 1 | 2 | 3 | 4 |
| Session D | 4 | 1 | 4 | 1 |

In some embodiments the attendee's responses form the basis for determining the most important working session, which will anchor the event schedule.

The importance of each session is determined by first calculating their overall score 208. This can be done for each session by multiplying the number of people who gave that particular session a ranking of, for example, 1, 2, 3 or 4 by the rank value and then adding together all of those numbers. Alternatively, the individual rankings can be modified prior to aggregation to determine the session's utility ranking. For example (with no modification factor), the overall score for session A may be calculated as follows:

$$(60\times3)+(20\times3)+(15\times2)+(5\times2)=280.$$

Taking the same approach as above the sessions are scored as follows: Session A—280; Session B—230; Session C—165; and Session D—325. From this information the most popular session can be determined 210. Since "1" was the highest rank, the lowest score is the highest ranked session. Therefore, session C was the most important in that the most people ranked it the best.

In this example, there are two rooms and therefore two sessions running simultaneously in the schedule, meaning that one worker present for the entire day can attend at maximum two full sessions. This means that whichever two sessions an individual worker has rated most highly are the ones the worker would attend if maximum satisfaction and productivity is to be met, in other words if they had an ideal schedule.

Using this information, the number of workers 212 who are planning on attending session C is forecast by adding together the number of attendees who ranked it in the top half of their ranking (in this case either a 1 or a 2). Referencing the information in Table 9, we determine this number is 80 people.

In order to book a room (facility) 214 for session C, the projected or forecasted number of workers (attendees) may then be compared with the room (facility) size information. We see that session C should be assigned to the first room (the larger room). Session C is now tentatively put forth in the schedule as the first session to occur in the first room.

During time block 1, session C will run concurrently with a second session, which needs to be determined 216. Since it is known that session C will run in the larger of the two rooms, this concurrent session must be able to fit in the second room (the smaller room). Furthermore, an attendee who wishes to attend session C ideally should be able to. Therefore, we want to schedule, concurrent to session C, a session which was ranked highly by people who did not rank session C highly.

An additional consideration is that those who attend session C get to attend their other favourite session.

Therefore, the people who ranked C as a 1 or a 2 are identified to see what they ranked as 3 or 4. It is desirable to maximize the number of attendees to be able to attend their top two rankings. From Table 9 it is seen that session B is ranked 2 by 60 people and that session D is ranked 1 by 20 people. It is also evidence that A is ranked '3' by all these 80 people in our subset (those who ranked presenter C as "1" or "2").

Therefore, session A then is the best to schedule concurrently with session C. To estimate the attendance 218 for session A, the number of people who ranked it as either a "1" or a "2" is determined. Table 9 shows that 20 people ranked it as a "2" and no one ranked it as a "1", therefore the forecast attendance is 20 people. It is then determined whether or not the estimated attendance 218 conflicts with the available room size 219. If there are no conflicts the program will proceed to place the identified session in the schedule concurrent to session C but in the second room 220. If there is a conflict with the room size, then that session would be discounted and the program would return to step 216 to determine a concurrent session based on the remaining sessions.

The question is then asked if all of the sessions are booked in rooms 222. In this case the answer is "no" and so the next step repeats the steps using the remaining options—B and D—for the second time block. Of the two remaining options, session B is the most popular, so the forecasted attendance at the session with speaker B is determined and slotted into a room, in this case the first room. This means session D will run concurrently with session B and from Table 9 its forecast attendance allows it to fit into the second room.

As all of the sessions have now been booked in a room the resulting computer generated event schedule is produced 224 and in this case is shown in Table 10. This event schedule can be sent out to the event organizer, in this case the office managers, for approval 226. Once approved the final schedule is published 228 and can be sent wirelessly to workers.

TABLE 10

|  | Room 1 | Room 2 |
| --- | --- | --- |
| Time Block 1 | C | A |
| Time Block 2 | B | D |

It is anticipated that the steps of this method will occur by way of computer program so that the published schedule is usable by the attendees and organizers, especially when dealing with events that are complex and involve more workers.

Even from this simplistic example of only four sessions, the possible advantages can be identified. The information compiled in Table 9 shows that 60 people most wished to attend sessions C and B; 20 people most wished to attend sessions D and C; 15 people most wished to attend sessions B and A; and 5 people most wished to attend sessions D and A.

Of the 100 workers, the example embodiment of the process has adopted the time and space requirements such that all of the workers participated in their 'ideal' day of meetings and activities in order of importance, without conflict to space or time and with a more efficient utilization of space than possible at many traditionally organized office or workplace.

While in more complex scenarios all workers being able to attend their "ideal" schedule may not be possible, it is anticipated that using this method a larger percentage of workers will be able to attend their preferred schedule than using traditional scheduling methods. In more complex situations additional factors may also be considered along with, or alternatively to, the least favourable ranking score from the already-scheduled subset. The overall goals of the event organizer may direct what factors could be given what weight to the overall schedule generation calculation.

Airlines

In one embodiment the disclosed method can be applied to airlines, where the event is all the seats on a plane for a single flight. Therefore, in this example one preview session may provide a preview for multiple events. Table 11, below, outlines examples of which parties can fulfil the roles described in the general method described above.

TABLE 11

| General Method | Airline |
| --- | --- |
| Organizer | Administrators |
| Attendee | Passengers |
| Ranker | Passengers |
| Session | Individual spot on any one flight |
| Facility | Seats |

At step 101 facility information entered by the organizer can include the number of planes, the number of facilities (seats in this case) and the type of the facility (the class of seat, for example, first class, business class, economy class etc.).

In some embodiments the organizer can also set a buffer constant. In some embodiments the buffer constant can be about one day or any amount of time that would be appropriate in the circumstance.

The "preview session" in the airline setting is the set of airports from which departures and arrivals are available. In some embodiments the departure location, arrival location and desired dates are selected from a preview session (in this case a preview list). More specifically, by selecting a departure location the ranker is ranking the selected location as "1" and the unselected locations as "0". In some embodiments a session is generated with the departure and arrival attributes previewed and then selected by the ranker.

In some embodiments the ranking information can be modified, for example in some embodiments attendees (in this case passengers) who are members of a loyalty program or who have paid more for a ticket may have their rankings multiplied by a given factor.

In some embodiments the requirements rankings of the session can include strict requirements, like the class of the facility (in this case a seat). In some embodiments the requirement rankings of the session may include preferences, such as that the facility be a window seat. For some attendees it is contemplated that strict requirements for some are preferences for others, and vice versa. In some embodiments the requirements rankings of the session may include both strict requirements and preferences.

Once this information is provided, the individual ranking for each session is determined, with the highest utility ranking session being selected for scheduling. The highest ranking facility is identified which conforms to the parameters provided by the requirements rankings. For example, where an attendee (the airline guest or passenger) ranked certain characteristics of the facility (a seat on an airplane) as being preferred, for example the passenger (attendee) prefers a window seat, all those facilities which are window seats within the identified subset may be given a further multiplier or add-on to their ranking with respect to the particular session being considered.

Having identified the highest ranking appropriate facility, the session and facility are linked. The process then continues as previously described until all the sessions and facilities are linked.

Example-5

In this example, a single seat on an airplane equates to a facility, which will have one attendee at the session (flight). Therefore, while it is the session (flight) that is being ranked, since the session has only one attendee the session's ranking will be linked directly to the attendee and therefore the session's utility ranking can be modified based on attendee characteristics, for example their reward status or the type of seat they have selected.

In some embodiments the ranker would review a website that presented ticketing options and select basic flight information, for example the destination and date for the flight. In some embodiments the ranker would then be presented with different types of options for seats, for example, the seat on a flight may be classified as 'good', 'better' or 'best'. In some embodiments where an attendee has selected a seat type with a 'good' classification this can be linked to a low utility rating of the flight session (through the modification factor), a 'better' classification is more expensive, and comes with a higher utility rating, and a 'best' classification is the most expensive, and comes with the highest utility rating.

In some embodiments the ranker can provide other information regarding their preferences, or the preferences of the attendee, for example if a window seat is preferred. If yes, the value of all window seat facilities in respect to their flight session receive a +1. In some embodiments the ranking may be modified as a result of the ranker being part of a membership program with the airline.

The flight session with the highest utility ranking can be selected. In some embodiments, where there is a more than one flight session with the highest ranking, the first flight session (and therefore attendee) to be scheduled can be chosen at random.

A subset of all the available flights is identified that meet the destination and date requirements of the selected flight session.

The facilities are also assigned a value. In some embodiments the types of seats are assigned desirability values. For example, business-class seats might by assigned a value of '4', first class a value of '3', economy a value of '1', and economy with extra space (such as those bordered by the emergency exits) a value of '2'. These seat (facility) values may be further modulated by other desirability factors. For example, seats on flights with the shortest flight time and/or least number of layovers may be preferred. A seat on a flight with no layovers may be assigned an additional value of +3, a seat on a flight with one layover an additional value of +2, and a seat on a flight with two layovers an additional value of +1.

In some embodiments the seats can be modulated based on the preferences or requirements of the selected attendee. For example, if the passenger prefers a window seat, all window seats receive a further +1 in respect to that passenger's (attendee's) flight session.

The highest ranking seat (facility) is identified. The selected flight session (and associated attendee) is then scheduled into the highest ranked available seat.

The next highest ranking flight session (individual spot on the flight) is identified, and the process is repeated until there are no more potential attendees and/or seats available on the plane for that particular flight (event).

Movie Theaters

In one embodiment the disclosed method can be applied to movie theaters. Table 12, below, outlines examples of which parties can fulfil the roles described in the general method.

TABLE 12

| General Method | Movie Theaters |
| --- | --- |
| Organizer | Managers |
| Attendee | Viewers |
| Ranker | Viewers |
| Session | Movie |
| Facility | Individual theater |

At step 101 facility information entered by the organizer can include the seat capacity of various facilities (individual theaters) within the movie theater complex. In some embodiments the organizer may include certain characteristics of the facility, for example that it is equipped to show 3D movies or the like.

In some embodiments the organizer can also set a buffer constant. In some embodiments the buffer constant can be about two hours or any amount of time that would be appropriate in the circumstance.

The "preview session" in the movie theater setting is the movie trailers that are associated with each session (in this case movie) available at the facility (movie theater or movie theater complex). In some embodiments the rankers select the session they would like to see. In some embodiments, for example when the movie theater is having a festival or a movie marathon, the ranker can rate various sessions based on which they would most prefer to see.

In some embodiments the ranking information can be modified, for example in some embodiments the ranker/attendee who pays a higher ticket price may have their rankings multiplied by a given factor or modified in another manner.

In some embodiments the requirements rankings of the sessions can include strict requirements, like a 3D movie must be shown in a facility that is capable of showing a 3D movie. In some embodiments the requirements rankings of a session can include preferences, for example a session featuring a movie with a more recent release date may be preferred to be presented in a more modern or recently renovated facility.

Once this information is provided, the individual ranking for each session is determined, with the highest utility ranking session being selected for scheduling. The highest ranking facility is identified which conforms to the parameters provided by the requirements rankings. For example, if a session (in this case a movie) can only be shown on a 3D projector then only those facilities that have a 3D projector are considered.

Having identified the highest ranking appropriate facility, the session and facility are linked. The process then continues as previously described until all the sessions and facilities are linked.

Theme Parks

In one embodiment the disclosed method can be applied to theme parks. Table 13, below, outlines examples of which parties can fulfil the roles described in the general method.

TABLE 13

| General Method | Theme Park |
| --- | --- |
| Organizer | Administrators |
| Attendee | Guests |
| Ranker | Guests |
| Session | Attraction, ride, show etc. |
| Facility | Seats on or in attraction, ride, show etc. |

At step 101 facility information entered by the organizer can include an entry for each session, for example for each attraction, show or ride. In some embodiments the organizer can also enter information about the number of facilities (in this example seats) available for each session. In some embodiments the organizer can provide associated information about the facilities, for example if they are disability accessible or not.

In some embodiments the organizer can also set a buffer constant. In some embodiments the buffer constant can be about a day or any amount of time that would be appropriate in the circumstance.

The "preview session" in the theme park setting occurs when the ranker is provided with a list of sessions which are available to the attendee. The ranker then ranks the sessions they would most like to attend.

In some embodiments the ranking information can be modified, for example in some embodiments attendees who are at the theme park for a fewer number of days may have their rankings multiplied by a given factor or modified in another way, so as to ensure they experience their top experiences the in the shorter amount of time available. The number of days the attendee will be at the theme park may be indicated by the length of their ticket.

In some embodiments the requirements rankings of the sessions will also be set at strict requirements. For example, in the case of a theme park it is likely that all sessions must occur within their corresponding facility, meaning that an attendee attending a session A (for example a ride through a log-ride attraction) must be linked to a facility available in session A (for example a seat on said log-ride attraction).

Once this information is provided, the individual ranking for each session is determined, with the highest utility ranking session being selected for scheduling. The highest ranking facility is identified which conforms to the parameters provided by the requirements rankings. For example, if attendees indicated a certain requirement, for example disability access, all facilities identified as available must meet this requirement.

Having identified the highest ranking appropriate facility, the session and facility are linked. The process then continues as previously described until all the sessions and facilities are linked.

Schools

In one embodiment the disclosed method can be applied to schools. In a large scheduling system it is difficult to ensure that every individual, be they student, professor or other, can attend their ideal schedule. Using the method and system described herein it is anticipated that the generated schedule can provide greater satisfaction for the students, staff and administrators, while using fewer resources than would be possible at a conventionally organized school. Table 14, below, outlines examples of which parties can fulfil the roles described in the general method.

TABLE 14

| General Method | Schools |
|---|---|
| Organizer | Administrators |
| Attendee | Students |
| Ranker | Students |
| Session | Classes |
| Facility | Classrooms, theaters, labs |

At step 101 facility information entered by the organizer can include the capacity and type of facility, for example lecture hall, theater, science lab, classroom etc.

In some embodiments the organizer can also set a fixed schedule. In some embodiments the fixed turnover schedule can be about the length of a term or any amount of time that would be appropriate in the circumstance.

The "preview session" in the school setting is the prospective student (the "ranker") previewing a course guide to identify the sessions (in this case classes) available within a given term. The ranker then ranks the sessions that they would like to attend based on the information in the course guide.

In this example, the higher a number, the more significant this class is for the student. The students' rankings are stored as part of a user profile. A student may also rank various teaching staff, professors, instructors, lecturers or other similar persons after viewing preview information pertaining to their background or in the form of a previous experience with said person.

In some embodiments the ranking information can be modified, for example in some embodiments students who are in the final years of their program may have their rankings multiplied by a given factor.

In some embodiments the ranking information received with respect to a particular attendee can be modified with the view of their perceived best interests. For example, if a student ranks a history class as a '4', but the system shows that their major is in history and that they need more history credits in order to graduate, the system might automatically assign a further '+2' to the ranking to make the modified ranking for the student for the class a '6' overall.

In some embodiments, information on the individual student's past academic attendance or grade records may be used to decide on a modification to their ranking. For example, students with better performance overall may be given a higher weight to their rankings.

In some embodiments scheduling conflicts to do with prerequisite classes may be identified. For example, when a student submits a ranking for a class, the system may ask "Does this class have a prerequisite requirement?" If the answer is 'Yes', the system may identify which prerequisite or prerequisites are required. Checking against available attendance and grade data from previous terms, the system then might ask "Has the student taken and passed the prerequisites?" If the answer is 'yes', the student's original ranking of the class having said prerequisites may not be changed, or may be added to. If the answer is 'no', the student's original ranking of the class having the prerequisites may be lowered, as the student was found to be in error in requesting such a class for the upcoming term.

Figure 10:
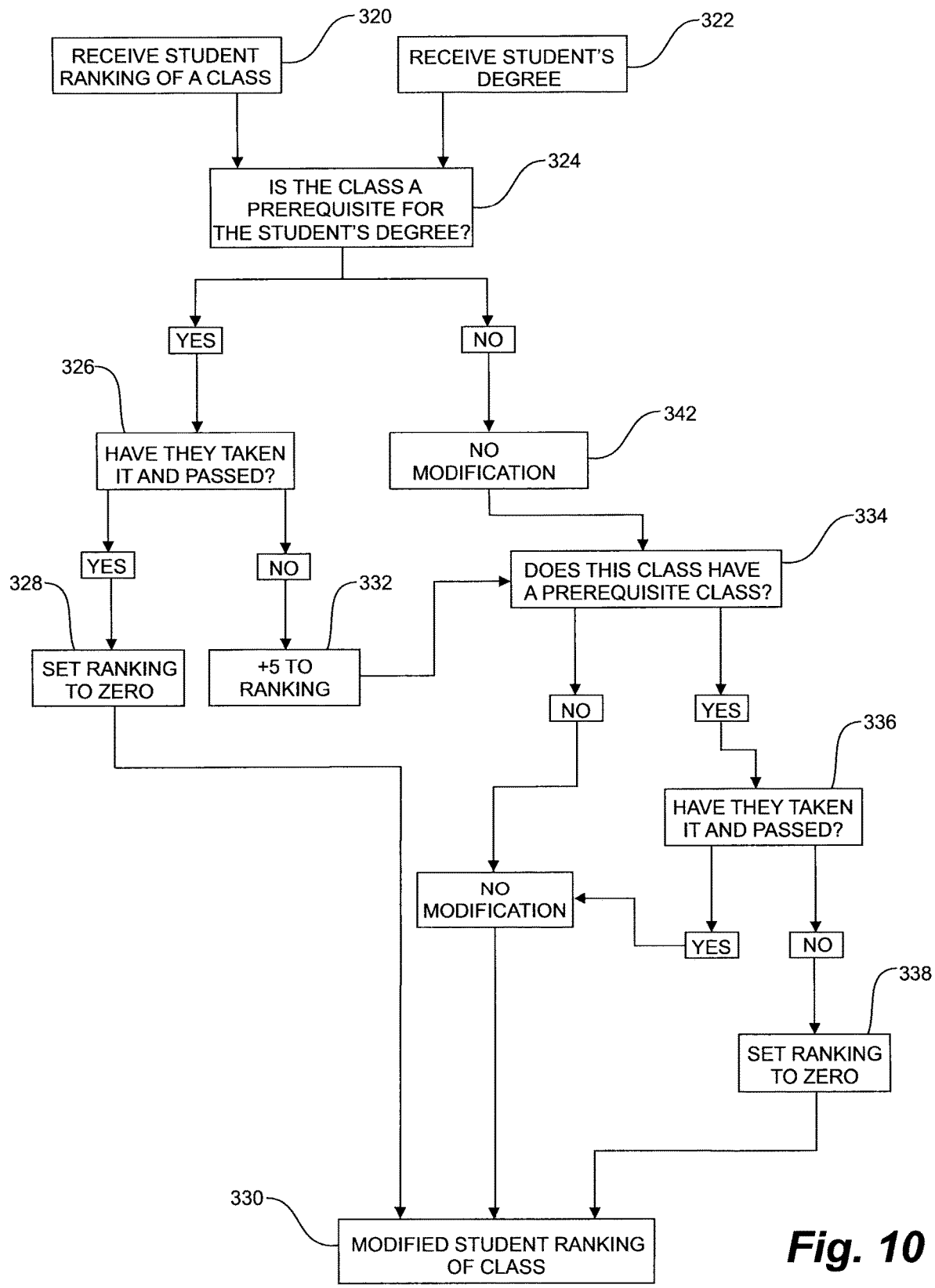
FIG. 10 is an example of the use of a modification factor in altering a session's ranking when determining the session's utility ranking.

One example of this type of modification factor is found in FIG. 10. In this example the student (attendee) provides ranking information for a class (session) 320. In this example both a degree modification, meaning a modification based on whether or not the session is a prerequisite for the attendee's degree, certificate, certification or graduation, and a prerequisite modification, meaning a modification based on whether or not the attendee has completed any prerequisite required to attend the session, are included.

More specifically, with respect to the degree modification, the ranked class is compared with information regarding the student's degree 322 and it is determined whether or not the class is a prerequisite for the student's degree 324. If it is a prerequisite, whether or not the student has taken and passed the course is determined 326. If the class has in fact been taken and passed, the ranking is set to zero 328 and the student's ranking of the class is modified 330. If the class is a prerequisite but it has not been taken and passed, a factor can be added to the ranking, for example +5, 332.

With respect to the prerequisite modification, it is determined if the ranked class itself has a prerequisite class 334. If there is no prerequisite, there is no further modification to the ranking and the modified class ranking is set 330. If the ranked class does have a prerequisite, it is determined whether or not the student has taken and passed the prerequisite class 336. If not the ranking is set to zero 338 (the student cannot take the ranked class if they have not passed the prerequisite). If the student has taken the prerequisite class and passed then no modifications are made. If at step 324 the ranked class is not a prerequisite for the student's degree then there is no modification to the ranking 342 and the method continues with step 334.

In some embodiments a student's rankings of instructional staff may be modified, either automatically or manually, by the system. For example, if the system checks past attendance data and finds that the student was previously in the instructor's class, and received a mark below a given threshold, the system may, based on the assumption that said student and said instructor do not perform well together, lower the student's given ranking of the said instructor.

In some embodiments the requirements rankings of the sessions can include strict requirements, like the session must occur in a science lab. In some embodiments the requirements rankings of the session can include preferences, for example for the session to be in a facility that is in a particular building on a school's campus.

Once this information is provided, the individual ranking for each session is determined, with the highest utility ranking session being selected for scheduling. The highest ranking facility is identified which conforms to the parameters provided by the requirements rankings, for example, if a session can only be occur in a science lab, only those facilities which are science labs are considered, and which best fits its estimated attendance while causing minimal conflicts.

Having identified the highest ranking appropriate facility, the session and facility are linked and scheduled into a particular time slot. The process then continues as previously described until all the sessions and facilities are linked and a schedule with all the sessions is completed.

In a further embodiment, students' rankings of both classes and professors/teachers/instructors/lecturers can be taken into account when generating a schedule. In some embodiments this information can be used to automate the registration process.

In some embodiments after a schedule assigning sessions to rooms and time slots is produced, instructional staff may then be assigned to sessions. For example, the highest overall ranking session in the schedule may be a chemistry class which may have already been scheduled to its most highly ranked facility. A list of instructional staff can be identified listing all of those staff available to teach chemistry. Each staff member may be given an aggregated ranking, which consists of all of the students to rank them having their modified rankings being added together. The highest ranking instructional staff member out of the subset identified (who is available to teach chemistry) may be assigned to teach the highest ranking session.

In some embodiments the process may be repeated until all sessions have an instructor assigned to them.

In some embodiments students may be automatically registered in the scheduled classes. Based on the student having previously submitted an independent rating of each class and each instructor, an updated class-instructor combination ranking could be calculated for each student in view of the finalized schedule with assigned instructors. In one example, by taking together that student's ranking of the class and their ranking of the teacher assigned to the class it is possible to identify the highest ranking session overall, and then identify the subset of students forecasted to attend this class session. Of this subset, the system may calculate each student's ranking for this class in consideration of its newly assigned instructor.

In some embodiments the number of seats in the class based on the capacity of the room in which the class was assigned can be determined and then the student with the highest ranking class-instructor number generated by the system out of the subset forecasted to attend could be assigned a seat in the class first, the second highest number determined for a student assigned the next seat, and so on, until no seats in the room's capacity are remaining, or there are no students left in the subset forecasted to attend the class.

In some embodiments the second highest ranking session overall can be identified and the process repeated, continuing on assigning students to seats within the newly formed class-instructor combinations until, for every class and instructor combination, either the entire seat capacity has been assigned to students or the subset of students forecasted to attend has been exhausted. At this point, the automatic portion of the registration process is complete.

Without any limitation to the foregoing, the present systems and methods are further described by way of the following example.

Example-6

In some embodiments, the method can be directed to a school scheduling its semester (the event). For example, the school has 100 students who are forecasted to attend during the semester. The school offers a total of four classes (A, B, C and D), to be split into two rooms in two time slots. The first room has a capacity of 90 people and the second room has a capacity of 30 people.

As outlined in FIG. 9 the 100 students each receive preview information 202 prior to the start of the semester which previews classes A, B, C and D. The students are prompted to rate the class 204 in order of importance and preference, with "4" being the class they liked best and need the most and "1" being the class they liked least and need the least. The responses are received 206 and for this example are shown in Table 15.

TABLE 11

|  | 60 people ranked: | 20 people ranked: | 15 people ranked: | 5 people ranked: |
| --- | --- | --- | --- | --- |
| Class A | 2 | 2 | 3 | 3 |
| Class B | 3 | 1 | 4 | 2 |
| Class C | 4 | 3 | 2 | 1 |
| Class D | 1 | 4 | 1 | 4 |

Based on the attendees response the most popular and important class is determined and will be the anchor in the school's semester schedule, since the most popular and important class being accessible by the most students is more likely to result in increased school satisfaction and usefulness of the school in meeting its programs' aims.

The utility (which we use here to mean a combination of popularity and importance) of each class can be determined by first calculating their overall score 208. This can be done for each class by multiplying the number of people who gave that particular class a ranking of 1, 2, 3 or 4 by the rank value and then adding together all of those numbers. For example, the overall score for class A may be calculated as follows: $(60\times2)+(20\times2)+(15\times3)+(5\times3)=220$.

Therefore, in this case, the classes (sessions) are scored as follows: Class A—220; Class B—270; Class C—335; and Class D—175. From this information the most popular session can be determined 210. Since "4" was the highest rank, the highest score is the highest ranked class. Therefore, class C has the highest utility, in that the most people needed or liked it the most.

Since there are four classes and two classes running simultaneously in each day of the schedule, and the schedule is the same on every day of school, one student present for the entire semester can attend at maximum of two full classes. This means that whichever two classes an individual student rated most highly are the ones the student implied they would attend, and here are forecasted to attend, if they had their ideal schedule.

Using this information, the number of students forecasted 212 to be attending class C can be determined by adding together the number of students who ranked it in the top half of their ranking (in this case either a 4 or a 3). Referencing the information in Table 15, it is determined that this number is 80 people.

In order to book a room 214 for class C, the projected or forecasted number of students may then be compared with the room size information. We see that class C should be assigned to the first room (the larger room). Class C is now tentatively put forth in the schedule as the first session to occur in the first room in the first time slot.

In line with the "best to best" method described herein, the system may next proceed to identify the second most highly ranking session overall, in other words the session with the highest utility ranking which has not been scheduled and therefore which is still remaining.

Referencing the foregoing information, the remaining session with the highest utility ranking is class B. In order to book a room for class B, the projected or forecasted number of students attending the session may be compared with the room size information. With regard to this information, class B should be assigned to the first room (the larger facility) and the available time blocks for the first room may be identified. The first time block in the first room has already been assigned to Class C, therefore, the next available time block in the first room is the second time block, and class B can be scheduled during the second time block in the first room.

The system may next proceed to identify the third most highly ranking session overall, which is the session with the highest utility ranking still remaining.

Referencing the foregoing information, the remaining session with the highest utility ranking is class A. In order to book a room for class A, the projected or forecasted number of students may then be compared with the room size information. The forecasted number of students can be determined as follows by considering that 20 people ranked class A a '3' and no one has ranked class A a '4'. Therefore, 20 attendees would be forecasted to attend class A if they are able to.

Due to the forecasted attendance in comparison with facility size, class A should be scheduled in the smaller of the two rooms. Since both time slots are available, class A can be tentatively linked to the first available time block in the second room.

Since there are concurrent sessions scheduled, there is a potential for conflicts. For the purpose of this example, a conflict is defined as anytime the same attendee is forecasted as wanting to attend sessions which are tentatively scheduled concurrently. To determine if the placement of class A in the second room in the first time block generates any conflicts, the session that will run concurrently to class A (in this case class C) is identified such that any attendee(s) forecasted as desiring to go to both sessions can be identified.

In this example, referencing the information in table 11, there are no people who have ranked both class A and class C as being in their ideal schedule. Class A can be scheduled into the first time block in the second room, as no conflicts are identified. If the system were to find there was a conflict present, in that it identified a person or persons who had indicated both class A and class C as being in their ideal schedule, in accordance with the method proposed in FIG. 4, the first time block for this facility would be discarded and any remaining time blocks available for the facility identified, tentatively selected and the resulting combination would be itself checked for conflicts.

The system may then proceed to the next highest ranking session remaining, in this case class D. Forecasting attendance for class D and comparing it to the capacity of the available facilities, it is determined that it should fit in the smaller room (the second room). Class D is tentatively linked to the smaller facility and tentatively scheduled into the only remaining time block. No conflicts are identified by this tentative scheduling and therefore class D is scheduled in the smaller facility in the second time slot.

The question is then asked if all of the classes (sessions) are booked in (linked to) rooms (facilities) 222. In this case the answer is "no" and so the method returns to step 210 and repeats the following steps with remaining options—classes B and D—for the second time block. In this case, of the two remaining options, class B is the ranked the highest, so its attendance forecast is determined and it is slotted into a room, in this case the first room. This means class D will run concurrently and from Table 15 its forecast attendance allows it to fit into the second room.

While in more complex scenarios all students being able to attend their ideal semester may not be possible, using this method a larger percentage of students will be able to attend their preferred semester. In more complex situations additional factors may also be considered along with, or alternatively to, those considered in this example. In some embodiments the overall goals of the school administrator will direct what factors will be given what weight to the overall schedule generation calculation.

TABLE 16

|  | Room 1 | Room 2 |
| --- | --- | --- |
| Time Block 1 | C | A |
| Time Block 2 | B | D |

While in more complex scenarios all students being able to attend their ideal semester may not be possible, using this method a larger percentage of students will be able to attend their preferred semester. In more complex situations additional factors may also be considered along with, or alternatively to, the least favourable ranking score from the already-scheduled subset. In some embodiments the overall goals of the school administrator will direct what factors will be given what weight to the overall schedule generation calculation.

The foregoing description of embodiments and examples of the disclosure has been presented for purposes of illustration and description. It is not intended to be exhaustive or to limit the disclosure to the forms described. Numerous modifications are possible in light of the above teachings. Some of those modifications have been discussed and others will be understood by those skilled in the art.

The embodiments were chosen and described in order to best illustrate the principles of the disclosure and various embodiments as are suited to the particular use contemplated. The above description of the embodiments of the invention is not intended to be exhaustive or to limit the invention to the precise form disclosed above or to the particular field of usage mentioned in this disclosure. The elements and acts of the various embodiments described above can be combined to provide further embodiments.

The scope of the disclosure is, of course, not limited to the examples or embodiments set forth herein, but can be employed in any number of applications and equivalent devices by those of ordinary skill in the art. Rather it is hereby intended the scope of the invention be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

Although a few embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification. Accordingly, the actual scope of the invention encompasses not only the disclosed embodiments, but also all equivalent ways of practicing or implementing the invention.

I claim:

1. A computer-implemented method of generating and revising an event schedule during the event which efficiently uses the facilities available at the event, the method comprising:
   a. generating an organizer user interface that allows the organizer to select, add, modify, remove, and amend previously inputted session and facility information via an input device;
   b. inputting of session and facility information for at least two sessions and at least two facilities into a database by at least one organizer using the organizer user interface;
   c. generating, by an attendee software application via an electronic device, an attendee user interface including a display option allowing at least two rankers to select, add, remove, or modify ranker preferences, wherein the user interface includes an interactive preference control that allows the one or more rankers to indicate the desired ranking preference through interactions with the interactive preference control;
   d. providing remote access to the at least two rankers via a network interface so that the at least two rankers can provide ranking preferences to the database in real time through direct interactions with the attendee user interface based on at least one preview session;
   e. submitting of ranking preferences for the at least two sessions by the at least two rankers, wherein the submitting of ranking preferences occurs as a result of the at least two rankers interacting with the interactive preference controls on the attendee user interface via an attendee network interface during the event time frame;
   f. receiving the ranking preferences entered by the at least two rankers via the attendee software application in real time;
   g. aggregating the ranking preferences from each ranker;
   h. converting the aggregated ranking preferences into an overall ranking of the at least one preview session through a computational process that weighs the collective inputs from the interactive attendee user interface;
   i. determining a respective utility ranking for the at least two sessions wherein the utility ranking is based at least in part on the overall ranking of the at least one preview session;
   j. applying a buffer constant to modify the at least two sessions available to be selected to schedule;
   k. selecting a session of the at least two sessions available to be selected having the highest respective utility ranking for scheduling;
   l. tentatively selecting a facility of the at least two facilities for linking to the selected session based on a respective requirements ranking;
   m. linking the selected session to the tentatively selected facility using a best fit method, wherein the best fit method is a best to best method or a best to the best of the worst of best method;
   n. scheduling the linked selected session and the tentatively selected facility into an available event time slot;
   o. repeating until all sessions of the at least two sessions are linked to a respective facility of the at least two facilities and scheduled into a respective event time slot to generate the event schedule which uses the at least two facilities in an efficient manner based on at least the utility ranking and in adherence with the buffer constant;
   p. electronically sending the generated event schedule to the at least one organizer;
   q. approving of the event schedule by the at least one organizer using the organizer user interface through interaction with the organizer user interface;
   r. electronically sending the approved event schedule to at least one attendee via the attendee software application in real time for display on the attendee user interface;
   s. inputting of additions, modifications and/or changes to one or more of the at least two sessions, the facility information, the buffer constant, the utility ranking and the overall ranking information by the at least one organizer through interaction with the organizer user interface or by at least one ranker through interaction with the attendee user interface during the event time frame;
   t. revising the approved event schedule in real time based on additions, modifications, or changes to one or more of the at least two sessions, the facility information, the utility ranking and the overall ranking information received through the organizer user interface or the attendee user interface, wherein the revised event schedule continues to use the at least two facilities in an efficient manner based on at least the utility ranking and in adherence with the buffer constant; and
   u. sending the revised event schedule to the at least one attendee via the attendee software application electronically in real time during the event time frame for display on the attendee user interface, which updates to show the revised schedule,
   wherein the method is implemented by a processor.

2. The computer-implemented method of claim 1 further comprising in step n determining if there are any unscheduled concurrent time slots and if so selecting a concurrent session for scheduling and repeating steps l-n until there are no unscheduled concurrent time slots.

3. The method of claim 2, wherein a subset of sessions having the lowest rankings by those forecasted to attend the scheduled concurrent session(s) is identified and wherein the selected concurrent session is the session in this subset that has the highest utility ranking.

4. The method of claim 1 wherein the selected session in step k is the session having the highest utility ranking remaining.

5. The method of claim 1 wherein the utility ranking is also based on at least one modification factor applied to the ranking preferences.

6. The method of claim 5 wherein the modification factor includes at least a prerequisite modification.

7. The method of claim 1 wherein the tentatively selected facility is the highest ranking facility remaining.

8. The method of claim 7 wherein the highest ranking facility remaining is determined based on session requirements rankings, facility rankings, or both.

9. The method of claim 1 further comprising resolving any conflicts prior to linking the selected session with the tentatively selected facility and the available event time slot.

10. The computer-implemented method of claim 1, further comprising:
   in step k forecasting the attendance of the selected session; and
   in step n determining if there is a forecasted over attendance of the selected session, determining if there are any unscheduled concurrent time slots and selecting a concurrent session for scheduling wherein if the previously selected session has a forecasted over attendance the concurrent session is selected which has an estimated pull away number similar to the forecasted over attendance and repeating steps l-n until there are no unscheduled concurrent time slots.

11. A system, comprising:
   at least one processor configured to implement the following steps:
   a. generating an organizer user interface that allows the organizer to select, add, modify, remove, and amend previously inputted session and facility information via an input device;
   b. inputting of session and facility information for at least two sessions and at least two facilities into a database by at least one organizer using the organizer user interface;
   c. generating an attendee user interface including a display option allowing at least two rankers to select, add, remove, or modify ranker preferences, wherein the user interface includes an interactive preference control that allows the one or more rankers to indicate the desired ranking preference through interactions with the interactive preference control;
   d. providing remote access to the at least two rankers via a network interface so that the at least two rankers can provide ranking preferences to the database in real time through direct interactions with the attendee user interface based on at least one preview session;
   e. submitting of ranking preferences for the at least two sessions by the at least two rankers, wherein the submitting of ranking preferences occurs as a result of the at least two rankers interacting with the interactive preference controls on the attendee user interface via an attendee network interface during the event time frame;
   f. receiving the ranking preferences entered by the at least two rankers via the attendee software application in real time;
   g. aggregating the ranking preferences from each ranker;
   h. converting the aggregated ranking preferences into an overall ranking of the at least one preview session through a computational process that weighs the collective inputs from the interactive attendee user interface;
   i. determining a respective utility ranking for the at least two sessions wherein the utility ranking is based at least in part on the overall ranking of the at least one preview session;
   j. applying a buffer constant to modify the at least two sessions available to be selected to schedule;
   k. selecting a session of the at least two sessions available to be selected having the highest respective utility ranking for scheduling;
   l. tentatively selecting a facility of the at least two facilities for linking to the selected session based on a respective requirements ranking;
   m. linking the selected session to the tentatively selected facility using a best fit method, wherein the best fit method is a best to best method or a best to the best of the worst of best method;
   n. scheduling the linked selected session and the tentatively selected facility into an available event time slot;
   o. repeating steps k-n until all sessions of the at least two sessions are linked to a respective facility of the at least two facilities and scheduled into a respective event time slot to generate the event schedule which uses the at least two facilities in an efficient manner based on at least the utility ranking and in adherence with the buffer constant;
   p. electronically sending the generated event schedule to the at least one organizer;
   q. approving of the event schedule by the at least one organizer using the organizer user interface through interaction with the user interface;
   r. electronically sending the approved event schedule to at least one attendee via the attendee software application in real time for display on the attendee user interface;
   s. inputting of additions, modifications and/or changes to one or more of the at least two sessions, the facility information, the buffer constant, the utility ranking and the overall ranking information by the at least one organizer through interaction with the organizer user interface or by at least one ranker through interaction with the attendee user interface during the event time frame;
   t. revising the approved event schedule in real time based on additions, modifications, or changes to one or more of the at least two sessions, the facility information, the utility ranking and the overall ranking information received through the organizer user interface or the attendee user interface wherein the revised event schedule continues to use the at least two facilities in an efficient manner based on at least the utility ranking and in adherence with the buffer constant; and
   u. sending the revised event schedule to the at least one attendee via the attendee software application electronically in real time during the event time frame for display on the attendee user interface, which updates to show the revised schedule.

12. The system of claim 11, wherein the steps further comprise:
   in step n determining if there are any unscheduled concurrent time slots and if so selecting a concurrent session for scheduling and repeating steps l-n until there are no unscheduled concurrent time slots.

13. The system of claim 12, wherein a subset of sessions having the lowest rankings by those forecasted to attend the scheduled concurrent session(s) is identified and wherein the selected concurrent session is the session in this subset that has the highest utility ranking.

14. The system of claim 11 wherein the selected session in step k is the session having the highest utility ranking remaining.

15. The system of claim 11 wherein the utility ranking is also based on at least one modification factor applied to the ranking preferences.

16. The system of claim 15 wherein the modification factor includes at least a prerequisite modification.

17. The system of claim 11 wherein the tentatively selected facility is the highest ranking facility remaining.

18. The system of claim 17 wherein the highest ranking facility remaining is determined based on session requirements rankings, facility rankings, or both.

19. The system of claim 11 wherein the processor is further configured to perform a step of resolving any conflicts prior to linking the selected session with the tentatively selected facility and the available event time slot.

* * * * *